US012773924B2

(12) United States Patent
Tang et al.

(10) Patent No.: US 12,773,924 B2
(45) Date of Patent: Oct. 27, 2026

(54) SYSTEM AND METHOD FOR ESTIMATING A REMAINING ENERGY RANGE OF A VEHICLE

(71) Applicant: BorgWarner US Technologies LLC, Wilmington, DE (US)

(72) Inventors: Li Tang, Troy, MI (US); Ankur Shiledar, Columbus, OH (US)

(73) Assignee: BorgWarner US Technologies LLC

( * ) Notice: Subject to any disclaimer, the term of this patent is extended or adjusted under 35 U.S.C. 154(b) by 233 days.

(21) Appl. No.: 18/072,602

(22) Filed: Nov. 30, 2022

(65) Prior Publication Data

US 2024/0308387 A1 Sep. 19, 2024

(51) Int. Cl.
*B60L 58/10* (2019.01)
*G08B 31/00* (2006.01)

(52) U.S. Cl.
CPC .............. *B60L 58/10* (2019.02); *G08B 31/00* (2013.01); *B60L 2240/60* (2013.01); *B60L 2260/52* (2013.01); *B60L 2260/54* (2013.01)

(58) Field of Classification Search
None
See application file for complete search history.

(56) References Cited

U.S. PATENT DOCUMENTS

| | | | |
|---|---|---|---|
| 9,121,719 B2 | 9/2015 | Stankoulov | |
| 9,517,702 B2 | 12/2016 | Liu | |
| 9,970,780 B2 | 5/2018 | Bai et al. | |
| 10,759,298 B2 * | 9/2020 | Wang | B60L 58/21 |
| 11,358,585 B2 | 6/2022 | Aggoune et al. | |
| 2012/0109408 A1 | 5/2012 | Siy et al. | |
| 2013/0166123 A1 | 6/2013 | Donald, III et al. | |
| 2016/0245662 A1 * | 8/2016 | Rajagopalan | G01C 21/3469 |
| 2016/0375787 A1 | 12/2016 | Liu | |
| 2018/0347997 A1 * | 12/2018 | Fujimura | B60L 15/2045 |
| 2019/0265057 A1 * | 8/2019 | Baglino | G01C 21/3469 |
| 2020/0117204 A1 * | 4/2020 | Lindemann | B60L 53/63 |
| 2020/0216067 A1 * | 7/2020 | Olin | B60W 20/15 |
| 2022/0176832 A1 * | 6/2022 | Espig | B60W 20/10 |

(Continued)

FOREIGN PATENT DOCUMENTS

| | | |
|---|---|---|
| CN | 112002124 A | 11/2020 |
| CN | 106767874 B | 2/2021 |

(Continued)

*Primary Examiner* — Davin Seol
(74) *Attorney, Agent, or Firm* — Dickinson Wright PLLC

(57) ABSTRACT

A method for estimating a remaining range of a vehicle battery charge includes identifying at least one route characteristic of a portion of a selected route, determining a vehicle energy consumption profile for a vehicle and determining a current state of charge of a vehicle battery of the vehicle. The method also includes determining, for the selected route, a route energy consumption profile and calculating an estimated remaining charge for the vehicle battery at an end of the selected route based on the state of charge of the vehicle battery and the route energy consumption profile. The method also includes determining whether the estimated remaining charge for the vehicle battery is within a vehicle battery charge range and, in response to a determination that the estimated remaining charge is within the vehicle battery charge range, generating a first indication; and providing the first indication.

12 Claims, 11 Drawing Sheets

(56) References Cited

U.S. PATENT DOCUMENTS

| | | | | |
|---|---|---|---|---|
| 2022/0176939 | A1 | 6/2022 | Poll et al. | |
| 2023/0118287 | A1* | 4/2023 | Bruneau | G01C 21/20<br>701/32.1 |
| 2023/0194281 | A1* | 6/2023 | Lane | G06N 20/00 |
| 2023/0222852 | A1* | 7/2023 | Duan | G06N 3/08<br>701/31.9 |

FOREIGN PATENT DOCUMENTS

| | | | |
|---|---|---|---|
| CN | 113424067 | A | 9/2021 |
| CN | 112002124 | B | 7/2022 |
| EP | 3680140 | A1 | 7/2020 |
| EP | 3091336 | B1 | 5/2021 |
| EP | 3992023 | A1 | 5/2022 |
| EP | 2785570 | B1 | 9/2022 |
| FR | 3119040 | A1 | 7/2022 |
| JP | 2011229356 | A | 11/2011 |
| JP | 5803548 | B2 | 11/2015 |
| JP | 2021063766 | A | 4/2021 |

* cited by examiner

SYSTEM AND METHOD FOR ESTIMATING A REMAINING ENERGY RANGE OF A VEHICLE

GOVERNMENT LICENSE RIGHTS

This invention was made with government support under the DE-AR0000794 contract awarded by United States Department of Energy, Advanced Research Projects Agency (ARPA-E). The government has certain rights in the invention.

TECHNICAL FIELD

This disclosure relates to vehicle energy usage, and in particular to systems and methods for estimating a remaining range of a vehicle.

BACKGROUND

Vehicles, such as cars, trucks, sport utility vehicles, crossovers, mini-vans, or other suitable vehicles, are increasingly relying on batteries to provide energy to a vehicle propulsion system (e.g., as is the case with an electric vehicle that uses one or more electric motors to provide propulsion or a hybrid vehicle that uses one or more electric motors and an internal combustion engine to provide propulsion).

In such vehicles, it may be difficult to accurately predict a remaining distance (e.g., which may be referred to as a range) that a vehicle can travel with the remaining battery charge or energy of one or more vehicle batteries of the vehicle. This may lead to operator anxiety, as it may be inconvenient, difficult, or impossible to charge the vehicle battery prior to the vehicle arriving at a desired destination. Additionally, difficulty in accurately predicting the remaining distance that the vehicle can travel with the remaining battery charge or energy of the one or more vehicle batteries may dissuade potential vehicle purchasers from purchasing an electric vehicle or hybrid vehicle.

SUMMARY

This disclosure relates generally to vehicle propulsion control systems and methods.

An aspect of the disclosed embodiments is a method for estimating a remaining range of a vehicle battery charge or energy. The method includes identifying at least one route characteristic of a portion of a selected route, determining a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route, and determining a current state of charge of a vehicle battery of the vehicle. The method also includes determining, for the selected route, a route energy consumption profile based on the at least one route characteristic of the portion of the selected route and the vehicle energy consumption profile and calculating an estimated remaining charge for the vehicle battery at an end of the selected route based on the state of charge of the vehicle battery and the route energy consumption profile. The method also includes determining whether the estimated remaining charge for the vehicle battery is within a vehicle battery charge range and, in response to a determination that the estimated remaining charge is within the vehicle battery charge range, generating a first indication; and providing the first indication.

Another aspect of the disclosed embodiments, incudes a system for estimating a remaining range of a vehicle battery charge. The system includes a processor and a memory. The memory includes instructions that, when executed by the processor, cause the processor to: identify at least one route characteristic of a portion of a selected route; determine a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route; determine a current state of charge of a vehicle battery of the vehicle; determine, for the selected route, a route energy consumption profile based on the at least one route characteristic of the portion of the selected route and the vehicle energy consumption profile; calculate an estimated remaining charge for the vehicle battery at an end of the selected route based on the state of charge of the vehicle battery and the route energy consumption profile; determine whether the estimated remaining charge for the vehicle battery is within a vehicle battery charge range; in response to a determination that the estimated remaining charge is within the vehicle battery charge range, generate a first indication; and provide the first indication.

Another aspect of the disclosed embodiments includes a non-transitory computer-readable storage medium, comprising executable instructions that, when executed by a processor, facilitate performance of operations, comprising: identifying at least one route characteristic of a portion of a selected route; determining a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route; determining a current state of charge of a vehicle battery of the vehicle; determining, for the selected route, a route energy consumption profile based on the at least one route characteristic of the portion of the selected route and the vehicle energy consumption profile; calculating an estimated remaining charge for the vehicle battery at an end of the selected route based on the state of charge of the vehicle battery and the route energy consumption profile; determining whether the estimated remaining charge for the vehicle battery is within a vehicle battery charge range; in response to a determination that the estimated remaining charge is within the vehicle battery charge range, generating a first indication; in response to a determination that the estimated remaining charge is less than a lower limit of the vehicle battery charge range, generate a second indication; providing, at a vehicle display, one of the first indication and the second indication.

Another aspect of the disclosed embodiments includes a method for estimating a remaining range of a vehicle battery charge. The method includes identifying at least one route characteristic of a portion of a selected route, determining a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route, and determining a current state of charge of a vehicle battery of the vehicle. The method also includes determining, for the selected route, a route energy consumption profile based on the at least one route characteristic of the portion of the selected route and the vehicle energy consumption profile and calculating an estimated remaining charge for the vehicle battery at an end of the selected route based on the state of charge of the vehicle battery and the route energy consumption profile. The method also includes determining whether the estimated remaining charge for the vehicle battery is within a vehicle battery charge range, and in response to a determination that the estimated remaining charge is within the vehicle battery charge range, generating a first indication. The method also includes, in response to a determination that the estimated remaining charge is less than a lower limit of the vehicle battery charge range, determining a target vehicle speed profile based on the at least one route characteristic, the vehicle energy consumption profile, and the state of charge of the vehicle battery, and generating a second indication; and providing one of the first indication and the second indication.

Another aspect of the disclosed embodiments includes a system for estimating a remaining range of a vehicle battery charge. The system includes a processor and a memory. The memory includes instructions that, when executed by the processor, cause the processor to: identify at least one route characteristic of a portion of a selected route; determine a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route; determine a current state of charge of a vehicle battery of the vehicle; determine, for the selected route, a route energy consumption profile based on the at least one route characteristic of the portion of the selected route and the vehicle energy consumption profile; calculate an estimated remaining charge for the vehicle battery at an end of the selected route based on the state of charge of the vehicle battery and the route energy consumption profile; determine whether the estimated remaining charge for the vehicle battery is within a vehicle battery charge range; in response to a determination that the estimated remaining charge is within the vehicle battery charge range, generate a first indication; in response to a determination that the estimated remaining charge is less than a lower limit of the vehicle battery charge range: determine a target vehicle speed profile based on the at least one route characteristic, the vehicle energy consumption profile, and the state of charge of the vehicle battery; and generate a second indication; and provide one of the first indication and the second indication.

Another aspect of the disclosed embodiments includes a non-transitory computer-readable storage medium, comprising executable instructions that, when executed by a processor, facilitate performance of operations, comprising: identifying at least one route characteristic of a portion of a selected route; determining a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route; determining a current state of charge of a vehicle battery of the vehicle; determining, for the selected route, a route energy consumption profile based on the at least one route characteristic of the portion of the selected route and the vehicle energy consumption profile; calculating an estimated remaining charge for the vehicle battery at an end of the selected route based on the state of charge of the vehicle battery and the route energy consumption profile; determining whether the estimated remaining charge for the vehicle battery is within a vehicle battery charge range; in response to a determination that the estimated remaining charge is less than a lower limit of the vehicle battery charge range: determining a target vehicle speed profile based on the at least one route characteristic, the vehicle energy consumption profile, and the state of charge of the vehicle battery; and generating an indication; and providing the second indication.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
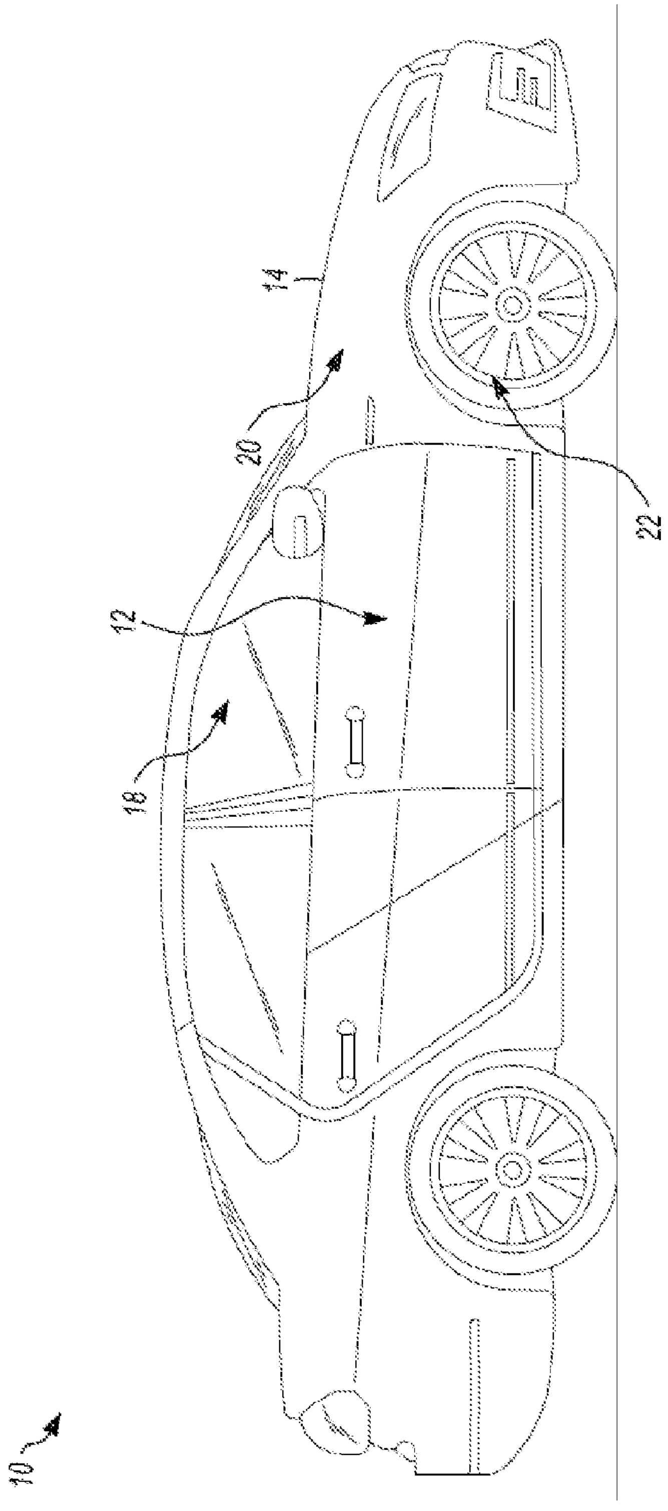
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, cross-overs, mini-vans, or other suitable vehicles, are increasingly relying on batteries to provide energy to a vehicle propulsion system (e.g., as is the case with an electric vehicle that uses one or more electric motors to provide propulsion or a hybrid vehicle that uses one or more electric motors and an internal combustion engine to provide propulsion).

In such vehicles, it may be difficult to accurately predict a remaining distance (e.g., which may be referred to as a range) that a vehicle can travel with the remaining battery life or charge of one or more vehicle batteries of the vehicle. This may lead to operator anxiety (e.g., which may be referred to as range anxiety), as it may be inconvenient, difficult, or impossible to charge the vehicle battery prior to the vehicle arriving at a desired destination. Additionally, difficulty in accurately predicting the remaining distance that the vehicle can travel with the remaining battery life or charge of the one or more vehicle batteries may dissuade potential vehicle purchasers from purchasing an electric vehicle or hybrid vehicle.

Range anxiety is one of the major challenges that hinder the widespread usage of electric vehicles (EVs). It is a psychological fear from EV owners that the vehicle may have insufficient energy to cover the distance to the intended destination and that the vehicle may be stranded prior to reaching the destination. While this was particularly true in the early stages of EV development, when the batteries used in EVs had limited capacity, many consumers still believe it to be the case even now with higher capacity batteries. What earlier used to be inadequate battery capacity has now been replaced by a lack of confidence in the estimated range displayed on a vehicle dashboard. According to recent literature, most EV drivers usually reserve about 30% of the on-dash estimated range due to a lack of trust in the accuracy of the remaining driving range (RDR) estimate.

Accordingly, systems and methods, such as those described herein, configured to provide accurate predictions of the RDR of a vehicle based on a current state of charge of at least one vehicle battery, may be desirable. In some embodiments, the systems and methods described herein may be configured provide an accurate estimate of the RDR in EVs, hybrid vehicles, and/or internal combustion engine vehicles by predicting the future energy consumption for a trip based on comprehensive driving conditions (e.g., which may include the information of route features, traffic conditions, operation of vehicles, driving styles, environmental impacts, and/or the like).

The systems and methods described herein may be configured to translate such information into the energy consumption in an energy storage system (ESS) (e.g., such as a battery or other suitable energy storage system). The systems and methods desired herein may be configured to determine the energy consumption of the vehicle for a particular route based on driving style recognition, speed profile prediction, and energy consumption from one or more wheels of the vehicle to the ESS. The systems and methods described herein may be configured to combine a model-based approach with a data-driven method, which may apply to all electric vehicle platforms regardless of the type of the ESS.

The systems and methods described herein may be configured to calculate the RDR can using Equation (1).

$$RDR(\text{miles}) = \frac{\text{Energy Remaining In Battery (kWH)}}{\text{Future Energy Consumption Per Mile}\left(\frac{\text{kWh}}{\text{mile}}\right)} \quad \text{Equation (1)}$$

The systems and methods desired herein may be configured to support the accurate determination of the RDR, by determining a reliable estimate for the future energy consumption (e.g., the denominator in Equation (1)). The systems and methods desired herein may be configured to reduce or alleviate range anxiety and reduce the amount of energy a driver intentionally reserves in the ESS due to uncertainty about the RDR, which is equivalent to increasing the useable energy capacity.

Range estimation methods can be categorized into history-based methods, model-based methods, and data-driven or machine learning (ML) methods. History-based methods may be relatively less reliable as they rely on the assumption that the future energy consumption will be similar to that of the past. Model-based approaches typically focus on building a driving profile over time to predict the future speed profile (e.g., acceleration, deceleration, average speed, and/or the like), of the vehicle by considering factors such as route information, speed regulations, driving behavior, and/or the like. Model-based estimations are typically more accurate than history-based approaches, but can also be computationally intensive, using a detailed model to represent the energy consumption of the vehicle. ML may leverage relatively large datasets to generate and develop algorithms capable of learning complex relationships between the different features of the data and eventually making credible predictions during the deployment. The systems and methods desired herein may be configured to combine the model-based approach with ML, to provide reliable range estimation without requiring significant computation power.

Most range estimation algorithms fail to address the problem of real-time range estimation and do not consider environmental and driver behavior factors, which may lead to a relatively large variance in energy consumption for a given trip or route. As such, the systems and methods desired herein may be configured to predict the energy consumption of a future trip or route using route features, traffic conditions, operation of vehicles, driving styles, environmental impacts, and/or other suitable characteristics or aspects of the vehicle, operator, route, traffic, and/or environment.

Figure 3:
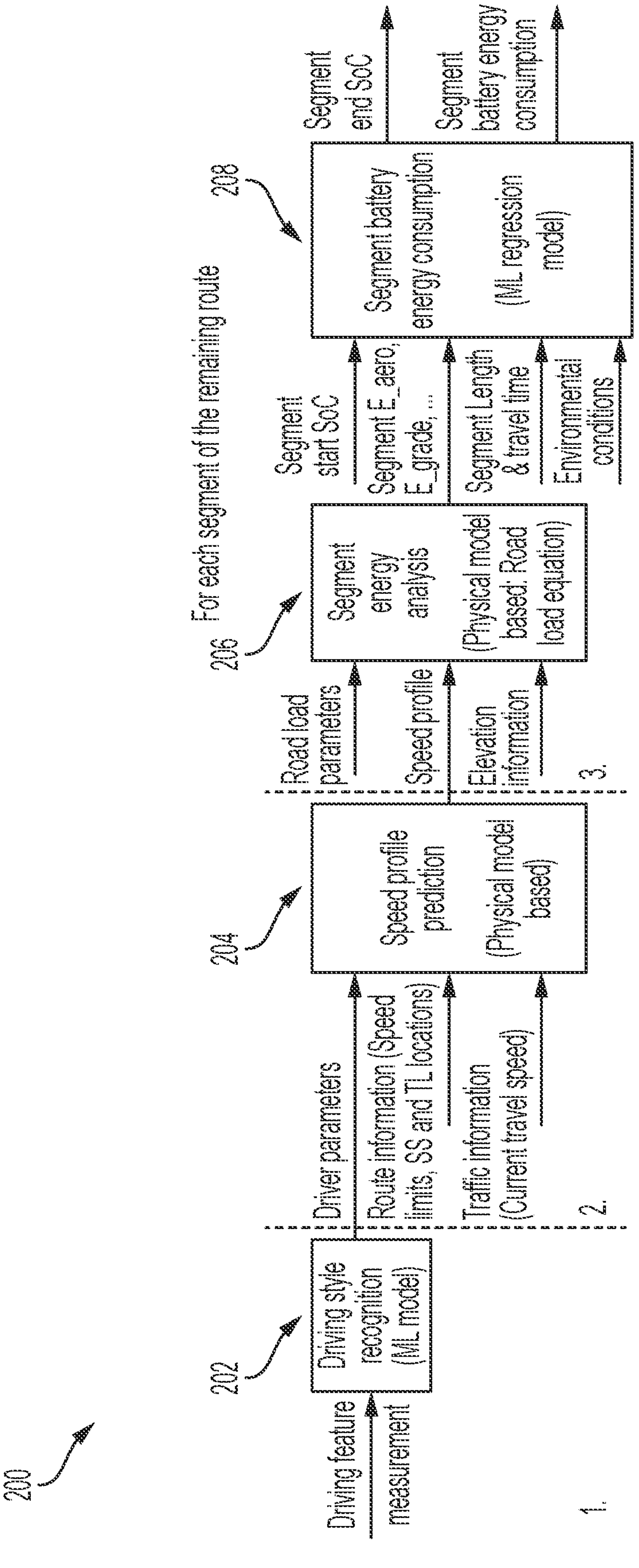
FIG. 3 is a flow diagram generally illustrating an energy consumption method according to the principles of the present disclosure.

In some embodiments, the systems and methods desired herein may be configured to translate the aforementioned information into the energy consumption in the ESS, as is generally illustrated as a method 200 in FIG. 3 (e.g., which includes driving style recognition, speed profile prediction, and energy consumption from wheel to ESS). For example, at 202, the method 200 may recognize a driving style based on one or more driving features (e.g., which may include one or more measurements). The systems and methods described herein may be configured to analyze driving behavior to store data in a driver profile that can be used for the prediction of a speed profile or for alerts related to energy savings. The driving features may include instantaneous velocity, pedal positions (e.g., acceleration and braking), distance to stop signs, distance to speed limit charge, speed limit offset, any other suitable driving feature, or a combination thereof. The systems and methods described herein may be configured to determine, based on the driving features, aggressiveness related driving style parameters, which are used in speed profile prediction. For example, an increase in aggressive driving may lead to a decrease in energy efficiency, while an increase in conservative driving may produce the opposite effect, which has an impact on RDR in the vehicle.

At 204, the method 200 predicts a speed profile, using a physical-based model. The systems and methods described herein may be configured to use the route information, the traffic conditions, and/or the driving style parameters to predict the speed profile for a route. The systems and methods described herein may be configured to extract route features from maps or navigation systems that may provide information regarding the road typology, distance between coordinates, elevation and/or grade, speed limit, stop sign (SS) locations, traffic light (TL) locations, alternative routes, location of charging/refill stations on the route, and/or the like. The systems and methods described herein may be configured to collect traffic information for both historic traffic pattern and real-time traffic conditions.

The systems and methods described herein may be configured to use historic data as stochastic behavioral trends, while using real-time data as deterministic (e.g., that the systems and method described herein may retrieve and update in real-time or substantially real-time, or any other suitable period). For example, the systems and methods described herein may be configured to define a color of a traffic light stochastically at the beginning of the route, and retrieve the current flow speed of a specific road section in real-time using navigation systems associated with the vehicle or associated with a computing device. The systems and methods described herein may be configured to use an enhanced driver model (EDM) to generate or predict a speed profile based on the route and traffic information as well as information generated at 202.

At 206, the method 200 analyzes segment energy usage using a physics-based model and a road load equation. For example, the systems and methods described herein may be configured to determine battery energy consumption for the predicted speed profile using a ML approach or a stochastic approach. The route may be composed of individual segments. The systems and methods described herein may be configured to identify speed profiles and elevation profiles for each segment using the information generate at 202 and 204. The systems and methods described herein may be configured to, using the road load equation and vehicle parameters, determine the energy at one or more wheels of the vehicle that overcome aerodynamic drag, rolling resistance, and/or grade along with energy to accelerate and decelerate on a given segment, using the physics-based model.

At 208, the method 200 provides, as input to the ML model (e.g., which may include an ML regression model), for each segment, the energy specifications along with additional information like segment length, expected travel time on the segment, battery state of charge (SoC) at the beginning of the segment, environmental conditions on the segment, and/or any other suitable features (e.g., based on the specific vehicle application, and available information).

Figure 4:
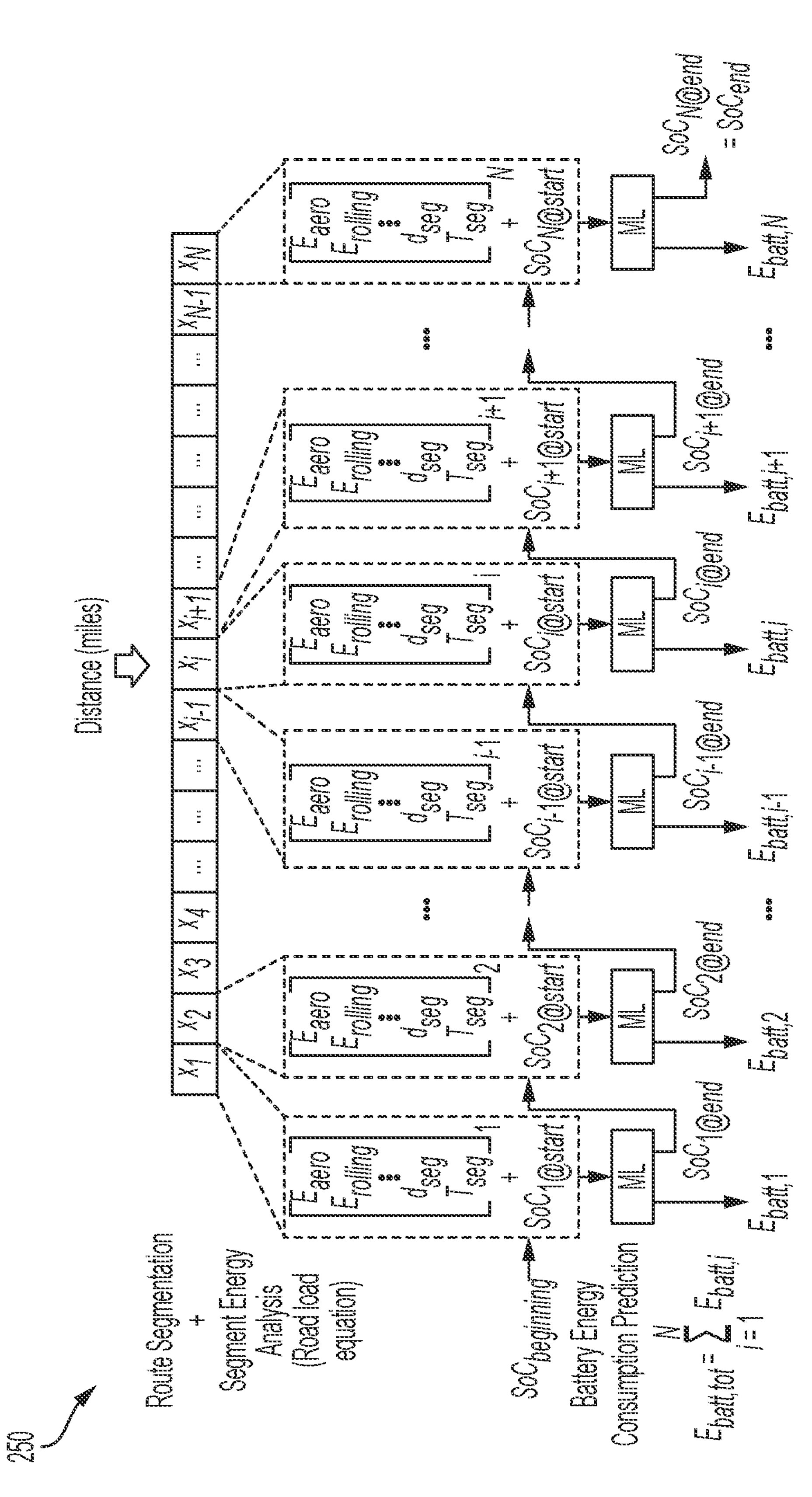
FIG. 4 generally illustrates an estimation of the energy consumption in a vehicle battery for a future trip using machine learning, according to the principles of the present disclosure.

In some embodiments, the ML model may be trained to predict the segment battery energy consumption and the expected SoC at the end of the segment given the segment input features. The ML model may be used in a recursive manner to estimate the battery energy consumption for each segment on the route, as is generally illustrated at 250 in FIG. 4. The systems and methods described herein may be configured to sum the estimated battery energy consumption for all the segments together to determine the total battery energy consumption for the remaining route. As the vehicle travels along the route, the systems and methods described herein may be configured to update (e.g., at any suitable interval or period) the battery energy consumption for the remaining route using updated traffic information, ambient conditions, and based on the latest vehicle-operating conditions.

In some embodiments, the systems and methods described herein may be configured to reduce or eliminate driver anxiety by selectively controlling propulsion of the vehicle according to a target speed profile or by providing recommendations to the driver for achieving the target speed profile. As described herein, the target speed profile may be configured to achieve an optimum energy consumption for the vehicle along the route, which may increase the likelihood that the vehicle will arrive at the destination before the vehicle battery is depleted.

The systems and methods described herein may be configured to reduced or eliminate the range anxiety of a driver of a battery EV using a comprehensive set of route characteristics for the route to a driver-defined destination to determine an optimized speed profile based on a driver-defined battery SoC to remain when the vehicle reaches the destination. The systems and methods described herein may be configured to allow the driver to trade-off the remaining SoC at the destination with travel time to the destination; provide updated end-of-trip SoC estimates and speed profiles during the trip based on unexpected events along the route; allow the driver to update the desired destination SoC during the trip; and/or alert the driver when a desired destination SoC is not achievable.

The systems and methods described herein may be configured to reduce range anxiety of the driver by having the driver using one of various propulsion features, such as adaptive cruise control and the like, with the target vehicle speed generated by an optimized target speed. The driver may use a human machine interface (HMI) to provide driver settings that include, at least: a desired destination; a desired minimum destination SoC; a value indicating the preferred trade-off between energy efficiency and travel time (e.g., an "aggressiveness factor"); a minimum value and a maximum value defining a speed band around the speed limit acceptable to the driver; and/or any other suitable information. The systems and methods described herein may be configured to determine an appropriate route to the destination and, based on the defined route, acquire a set of characteristics for that route, which may include static route characteristics and/or dynamic route characteristics. The static route characteristics may include: route and terrain (e.g., route distance, road topology, elevation, and/or any other suitable characteristics); vehicle and battery characteristics (e.g., aerodynamic drag coefficient, rolling resistance, battery capacity, and/or any other suitable characteristics); environmental characteristics (e.g., time of day and/or any other suitable characteristics); and/or driving behavior characteristics (e.g., maximum acceleration/deceleration and/or any other suitable characteristics. The dynamic route characteristics may include: route and terrain characteristics (e.g., traffic regulations, such as speed limits, traffic light, and/or stop-sign locations, traffic density, vehicle location, and/or any other suitable characteristics); vehicle and battery characteristics (e.g., mass of the vehicle, battery SoC, battery temperature, HVAC settings, and/or any other suitable characteristics); environmental characteristics (e.g., temperature, rain, wind speed and direction, and/or any other suitable characteristics); and/or driving behavior characteristics (e.g., driver aggressiveness and/or any other suitable characteristics).

Based on the route characteristics and the driver settings, the systems and methods described herein may be configured to determine whether an optimum target speed profile that results in a destination SoC that is greater than or equal to the minimum destination SoC exists. Static route characteristics may include: route and terrain (e.g., route distance, road topology, elevation, and/or any other suitable characteristics); vehicle and battery characteristics (e.g., aerodynamic drag coefficient, rolling resistance, battery capacity, and/or any other suitable characteristics); environmental characteristics (e.g., time of day and/or any other suitable characteristics); and/or driving behavior characteristics (e.g., maximum acceleration/deceleration and/or any other suitable characteristics. Dynamic route characteristics may include: route and terrain characteristics (e.g., traffic regulations, such as speed limits, traffic light, and/or stop-sign locations, traffic density, vehicle location, and/or any other suitable characteristics); vehicle and battery characteristics (e.g., mass of the vehicle, battery SoC, battery temperature, HVAC settings, and/or any other suitable characteristics); environmental characteristics (e.g., temperature, rain, wind speed and direction, and/or any other suitable characteristics); and/or driving behavior characteristics (e.g., driver aggressiveness and/or any other suitable characteristics).

If an optimal target speed profile solution exists that meets the driver settings, the systems and methods described herein may be configured to prompt the driver (e.g., using the HMI or other suitable display or interactive mechanism) to engage the adaptive cruise control. The systems and methods described herein may be configured to set the adaptive cruise control speed based on the optimal target speed profile. Along the route, the systems and methods described herein may be configured to recalculate the estimated destination SoC based on the updated route characteristics. If at any point along the route, the estimated destination SoC becomes more than a definable threshold below the driver desired minimum destination SoC, the systems and methods described herein may be configured to determine a new optimal target speed profile to the destination, and assuming a solution exists, replace previous target speed profile with the updated optimal target speed profile.

If at any point along the route an optimal target speed profile solution cannot be determined (e.g., no feasible solution exist to the given route characteristics and driver settings), the systems and methods described herein may be configured to determine a set of potential charging locations, present the potential charging stations to the driver, and allow the driver to select among potential charging stations. Based on the driver selection, the systems and methods described herein may be configured to operate the vehicle as described to reach the charging point location, and will indicate the minimum amount of charging needed to enable a feasible solution for the optimal target speed profile within the constraints of the driver settings. Once the vehicle is charged, the systems and methods described herein may be configured to then operate the vehicle as described to reach the ultimate driver destination.

In some embodiments, the systems and methods described herein may be configured to determine, responsive to the driver not entering a destination, using a navigation systems most probable path information, a destination, In some embodiments, the systems and methods described herein may be configured to, if it is determined that the vehicle should stop and be charged to reach the destination (e.g., within the constraints of the driver settings), optimize the charge profile to minimize battery aging, within the constraints of the driver settings.

In some embodiments, the systems and methods described herein may be configured to adapt to charges in the driver settings while the vehicle traverses the route. In some embodiments, the systems and methods described herein may be configured to, in addition to or alternatively to using the current HVAC settings, consider predicted HVAC settings (e.g., and energy use through the end of the trip), which may be based on learned driver HVAC history.

In some embodiments, the systems and methods described herein may be configured to, in addition to or alternatively to the driver providing the desired SoC at the destination, use a desired remaining range at the destination, provided by the driver In some embodiments, the systems and methods described herein may be configured to receive, via the driver settings, multiple destinations (e.g., a final destination, along with intermediate, waypoint destinations). Additionally, or alternatively, the systems and methods describe herein may be configured to request the driver enter a home location, and home charging availability, to account for the home destination charging opportunity.

In some embodiments, the systems and methods described herein may be configured to consider the price at different charging locations as part of determining the appropriate charging locations, when necessary to complete the trip. In some embodiments, the systems and methods described herein may be configured to allow the driver to enter a desired arrival time at the final destination (e.g., in addition to or instead of the final, destination SoC), and provide, if feasible, the required driving aggressiveness for the optimized driving profile and predicted final SoC.

In some embodiments, the systems and methods described herein may be configured to suggest remaining range and charging point based on the availability of the charging stations. For example, the driver may indicate a desire to have 50 miles of range left when the vehicle arrives at the desired destination. If the systems and methods described herein determines that the nearest charging station from the destination is 70 miles away, the systems and methods described herein may be configured to suggest 70 miles as the remaining range when the vehicle arrives at the desired destination.

In some embodiments, the systems and methods described herein may be configured to identify at least one route characteristic of a portion of a selected route. The systems and methods described herein may be configured to determine a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route. The systems and methods described herein may be configured to determine a current state of charge of a vehicle battery of the vehicle.

The systems and methods described herein may be configured to determine, for the selected route, a route energy consumption profile (e.g. which may represent the predicted energy usage for the route) based on the at least one route characteristic of the portion of the selected route and the vehicle energy consumption profile. The systems and methods described herein may be configured to calculate an estimated remaining charge for the vehicle battery at an end of the selected route based on the state of charge of the vehicle battery and the route energy consumption profile.

The systems and methods described herein may be configured to determine whether the estimated remaining charge for the vehicle battery is within a vehicle battery charge range (e.g., which may represent an acceptable range for proceeding with the route). The systems and methods described herein may be configured to, in response to a determination that the estimated remaining charge is within the vehicle battery charge range, generate a first indication. The first indication may include the estimated remaining charge for the vehicle battery at the end of the selected route.

The systems and methods described herein may be configured to, in response to a determination that the estimated remaining charge is less than a lower limit of the vehicle battery charge range, generate a second indication. The second indication may include a warning indicating that the vehicle battery may be depleted before the vehicle arrives at the end of the selected route. The systems and methods described herein may be configured to provide one of the first indication and the second indication (e.g., based on the outcome of the determination of whether the remaining charge for the vehicle battery is within the vehicle battery charge range). For example, the systems and methods described herein may be configured to provide the first indication and/or the second indication at a display of the vehicle, at a mobile computing device, to an autonomous controller of the vehicle, and/or the like.

In some embodiments, the systems and methods described herein may be configured to, in response to the determination that the estimated remaining charge is less than the lower limit of the vehicle battery charge range, determine a target vehicle speed profile based on the at least one route characteristic, the vehicle energy consumption profile, and the state of charge of the vehicle battery and generate the second indication. The second indication may further include a recommendation to follow the target vehicle speed profile to avoid depleting the vehicle battery before the vehicle arrives at the end of the selected route. The systems and methods described herein may be configured to control propulsion of the vehicle based on the target vehicle speed profile and/or by providing recommendations to an operator of the vehicle to achieve the target vehicle speed profile.

FIG. 1 generally illustrates a vehicle 10 according to the principles of the present disclosure. The vehicle 10 may include any suitable vehicle, such as a car, a truck, a sport utility vehicle, a mini-van, a cross-over, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 is disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force which is translated through the transmission to one or more axles which turns wheels 22. When the vehicle 10 includes one or more electric motors, a vehicle battery and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
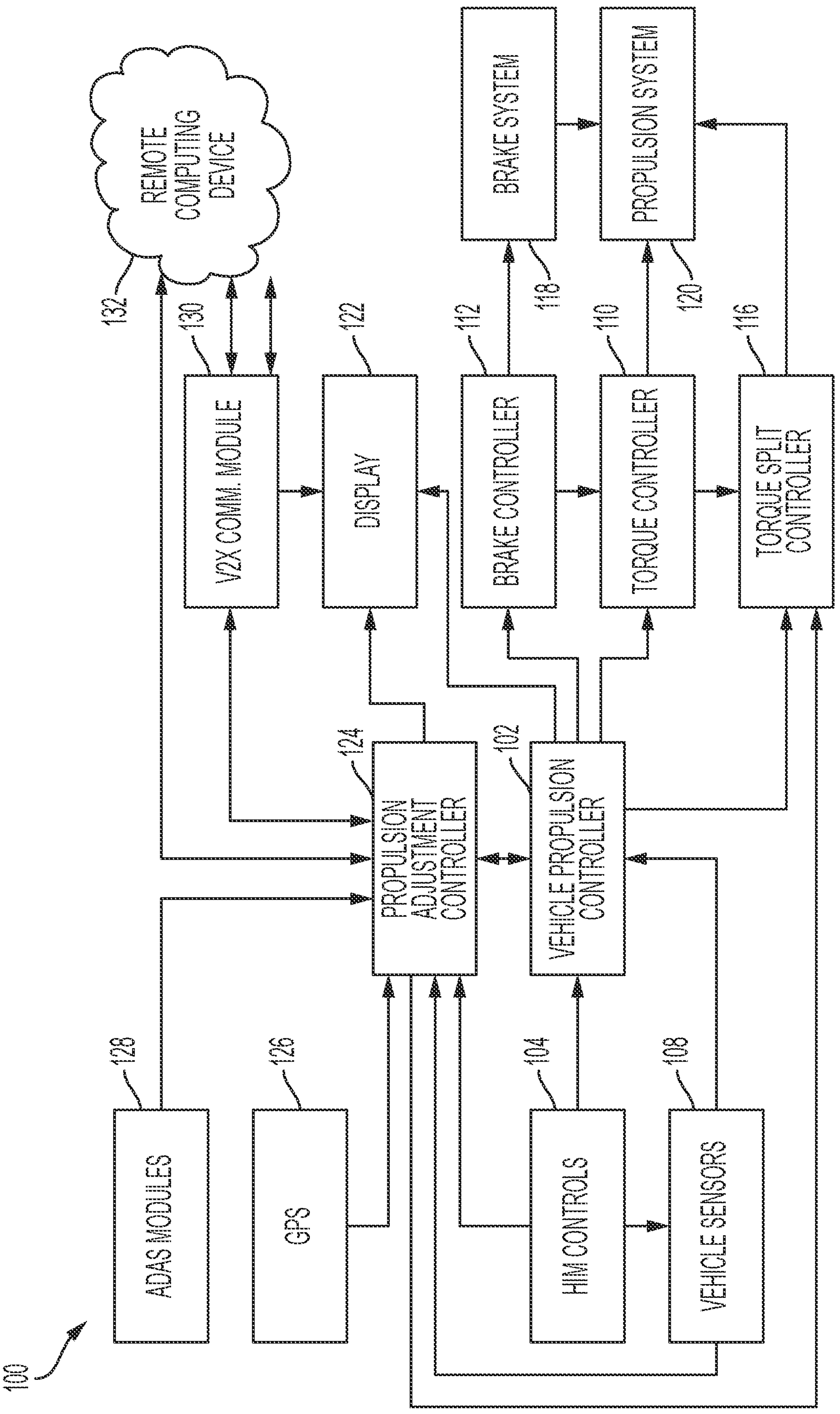
FIG. 2 generally illustrates a block diagram of a vehicle propulsion control system according to the principles of the present disclosure.

FIG. 2 generally illustrates a block diagram of a vehicle propulsion control system 100 according to the principles of the present disclosure. The system 100 may be disposed within a vehicle, such as the vehicle 10. The system 100 is configured to selectively control propulsion of the vehicle 10 and, in some embodiments, the system 100 is configured to determine profiles for a target vehicle speed and/or a target vehicle torque split based on various input information (e.g., route information, vehicle characteristic information, traffic information, other suitable information, or a combination thereof). The profiles of the target vehicle speed and/or the target vehicle torque split correspond to a vehicle speed at which the vehicle 10 achieves an optimum energy consumption efficiency with respect to a portion of a route being traversed by the vehicle 10.

In some embodiments, the system 100 may include a vehicle propulsion controller (VPC) 102, human machine interface (HMI) controls 104, vehicle sensors 108, a torque controller 110, a brake controller 112, a torque split controller 116, a brake system 118, a propulsion system 120, and a display 122. In some embodiment, the display 122 may include a portion of a dash or console of the vehicle 10, a navigation display of the vehicle 10, or other suitable displays of the vehicle 10. In some embodiments, the display 122 may be disposed on a computing device, such as a mobile computing device used by the driver. In some embodiments, the system 100 may include a propulsion adjustment controller (PAC) 124, a global position system (GPS) antenna 126 in communication with a mapping characteristics module (not shown), advanced driver assistance system (ADAS) modules 128, and a vehicle to other systems (V2X) communication module 130. The V2X communication module 130 may be configured to communication with other vehicles, other infrastructure (e.g., such as traffic infrastructure, mobile computing devices, and/or other suitable infrastructure), a remote computing device (e.g., the remote computing device 132), other suitable systems, or a combination thereof. As will be described, the system 100 may be in communication with one or more remote computing devices 132. In some embodiments, at least some of the components of the system 100 may be disposed in a propulsion control module (PCM) or other onboard vehicle computing device. For example, at least the PAC 124 and the VPC 102 may be disposed within the PCM. In some embodiments, the system 100 may be at least partially disposed within the PCM while other components of the system 100 are disposed on a standalone computing device having a memory that stores instructions that when executed by a processor cause the processor to carry out the operations of the components. For example, the PAC 124 may be disposed on a memory and executed by a processor. It should be understood that the system 100 may include any combination of computing devices, either disposed locally in the vehicle 10 and/or disposed remotely, as will be described.

In some embodiments, the VPC 102 may include an automatic vehicle propulsion system. For example, the VPC 102 may include a cruise control mechanism, an adaptive cruise control mechanism, an automatic braking system, other suitable automatic vehicle propulsion system, or a combination thereof. Additionally, or alternatively, the VPC 102 may include or be a portion of an autonomous vehicle system that controls all or a portion of vehicle propulsion, steering, braking, safety, route management, other autonomous features, or a combination thereof. It should be understood that, while only limited components of the system 100 are illustrated, the system 100 may include additional autonomous components or other suitable components.

The VPC 102 is in communication with one or more human to machine interfaces (HMI) 104. The HMI controls 104 may include any suitable HMI. For example, the HMI controls 104 may include a plurality of switches disposed on a steering wheel of the vehicle 10, on the dash or console of the vehicle 10, or any other suitable location on the vehicle 10. In some embodiments, the HMI controls 104 may be disposed on a mobile computing device, such as a smart phone, tablet, laptop computer, or other suitable mobile computing device. In some embodiments, the driver of the vehicle 10 may interface with the HMI controls 104 to use the VPC 102 to control vehicle propulsion and/or other features of the VPC 102. For example, the driver may actuate an HMI switch of the HMI controls 104 disposed on the steering wheel of the vehicle 10. The HMI controls 104 may communicate a signal to the VPC 102. The signal may indicate a desired vehicle speed selected by the driver. The VPC 102 generates a torque demand corresponding to the desired vehicle speed and communicates the torque demand to a torque controller 110. The torque controller 110 is in communication with the propulsion system 120 and/or other vehicle propulsion systems of the vehicle 10. The torque controller 110 selectively controls the propulsion system 120 and/or the other vehicle propulsion systems using the torque demand to achieve the desired vehicle speed. The driver may increase or decrease the desired vehicle speed by actuating additional switches of the HMI controls 104. The VPC 102 may adjust the torque demand to achieve the increase or decrease in the desired vehicle speed.

The VPC 102 may continuously adjust the torque demand in order to maintain the desired vehicle speed. For example, the VPC 102 may be in communication with the vehicle sensors 108. The vehicle sensors 108 may include cameras, speed sensors, proximity sensors, other suitable sensors as will be described, or a combination thereof. The VPC 102 may receive a signal from the vehicle sensors 108 that indicates a current vehicle speed. The VPC 102 may adjust the torque demand to adjust the vehicle speed when the signal indicates that the current vehicle speed is different from the desired vehicle speed. For example, the vehicle 10 may traverse an incline that causes the vehicle 10 to reduce current vehicle speed (e.g., because the torque demand applied by the torque controller 110 is insufficient to maintain vehicle speed while on the incline). The VPC 102 may increase the torque demand in order adjust the current vehicle speed, thereby achieving the desired vehicle speed.

In some embodiments, such as when the VPC 102 includes an adaptive cruise control mechanism, the VPC 102 may adjust the torque demand based on the proximity of a lead vehicle (e.g., a vehicle immediately in front of the vehicle 10). For example, the VPC 102 may receive information from the vehicle sensors 108 indicating the presence of a lead vehicle. The information may be captured by the vehicle sensors 108 using cameras, proximity sensors, radar, the V2X communication module 130, other suitable sensors or input devices, or a combination thereof. The VPC 102 may determine whether to maintain the desired vehicle speed or increase or decrease the torque demand in order to increase or decrease the current vehicle speed. For example, the driver may indicate, using the HMI controls 104, to maintain pace with the lead vehicle while keeping a safe stopping distance between the vehicle 10 and the lead vehicle. The VPC 102 may selectively increase the torque demand if the lead vehicle is traveling faster than the vehicle 10 and may selectively decrease the torque demand if the lead vehicle is traveling slower relative to the vehicle 10.

The VPC 102 may bring the vehicle 10 to a complete stop when the lead vehicle comes to a complete stop. For example, the VPC 102 may be in communication with the brake controller 112 to send a plurality of signals over a period indicating to the brake controller 112 to control vehicle braking (e.g., the VPC 102 may bring the vehicle to a stop over a period so as not to suddenly stop the vehicle, however, in the case of a sudden stop of the lead vehicle, the VPC 102 brings the vehicle 10 to a sudden stop to avoid collision with the lead vehicle). The brake controller 112 may be in communication with the brake system 118. The brake system 118 may include a plurality of brake components that are actuated in response to the brake controller 112 implementing braking procedures based on the plurality of signals from the VPC 102. In some embodiments, the VPC 102 may implement engine braking through a regenerative braking system by adjusting the torque demand to allow the vehicle 10 to come to a stop without use of the brake system

118 or the VPC 102 may use a combination of regenerative braking and the brake system 118 to bring the vehicle 10 to a complete stop. In order to resume vehicle propulsion control, the driver indicates to resume vehicle propulsion control using the HMI controls 104 (e.g., the VPC 102 is not configured to resume vehicle propulsion control without interaction from the driver). In some embodiments, the vehicle 10 may include a higher level of automation including a higher level of propulsion control, as described, and may include suitable controls for bringing the vehicle 10 to a complete stop without interaction with the driver of the vehicle 10.

In some embodiments, the VPC 102 may determine a torque split in order to utilize an internal combustion engine and an electric motor of the vehicle 10 (e.g., in the case where the vehicle 10 is a hybrid vehicle). It should be understood that while only an internal combustion engine and an electric motor are described, the vehicle 10 may include any hybrid combination of any suitable vehicle engines and motors. The torque split indicates a portion of the torque demand to be applied to the internal combustion engine and a portion of the torque demand to be applied to the electric motor. For example, the electric motor may be used for vehicle propulsion when the torque demand is below a threshold. However, when the torque demand is above the threshold (e.g., such as the case when the vehicle 10 is on a steep incline) the internal combustion engine may provide at least a portion of vehicle propulsion in order to assist the electric motor. The VPC 102 communicates the torque split to the torque split controller 116. The torque split controller 116 is in communication with the propulsion system 120 to apply the torque split.

In some embodiments, the VPC 102 includes a plurality of safety controls. For example, the VPC 102 may determine whether to increase or decrease the torque demand, thereby increasing or decreasing the desired vehicle speed or current vehicle speed, based on input from the safety controls. The safety controls may receive input from the vehicle sensors 108. For example, the safety controls may receive proximity sensor information, camera information, other information, or a combination thereof and may generate a safety signal that indicates to the VPC 102 to perform one or more safety operations. For example, in the case of a lead vehicle coming to a sudden stop, the safety controls may generate a safety signal, based on proximity information from the vehicle sensors 108, indicating to the VPC 102 to immediately bring the vehicle 10 to a complete stop. In some embodiments, the VPC 102 may determine whether to apply the desired vehicle speed set by the driver using the HMI controls 104 based on the signal from the safety controls. For example, the driver may increase the desired vehicle speed which may bring the vehicle 10 closer to the lead vehicle (e.g., the vehicle 10 would travel faster than the lead vehicle if the desired vehicle speed were achieved). The VPC 102 may determine not to apply the desired vehicle speed, and instead may provide an indication to the display 122 indicating to the driver that increasing the desired vehicle speed may be unsafe or the VPC 102 may ignore the increase in the desired vehicle speed. In some embodiments, the VPC 102 may be in communication with a transmission controller module (TCM). The VPC 102 may receive information from the TCM (e.g., an automatically selected gear) and may determine and/or adjust the total torque demand based on the information received from the TCM.

As described, the system 100 includes a PAC 124. The PAC 124 is configured to determine a profile for a target vehicle speed based on, at least, route information of a route being traversed by the vehicle 10, vehicle parameters of the vehicle 10, information about other vehicles proximate to the vehicle 10, traffic information, weather information, the current vehicle speed, the desired vehicle speed, other information, or a combination thereof. As will be described, the PAC 124 may determine the profile for the target vehicle speed based on an energy consumption profile of the vehicle 10. The energy consumption profile may be generated using the information described above and may indicate an optimum energy consumption of the vehicle 10 for various route characteristics, such as road grades, curvatures, traffic, speed limits, stop signs, traffic signals, other route characteristics, or a combination thereof.

The PAC 124 receives route characteristics (e.g., road grade characteristics, route distance, and route directions), vehicle parameters, traffic characteristics, weather characteristics, vehicle to vehicle parameters, other information or characteristics, or a combination thereof. In some embodiments, the PAC 124 receives at least some of the route characteristics from a mapping characteristics module based on location information from the GPS antenna 126. The mapping characteristics module disposed within the vehicle 10 (e.g., within the system 100) or may be disposed on a remote computing device, such as the remote computing device 132. When the mapping characteristics module is disposed on the remote computing device 132, the GPS antenna 126 may capture various global positioning signals from various global positioning satellites or other mechanisms. The GPS antenna 126 may communicate the captured signals to the mapping characteristics module. The mapping characteristics module may generate the route characteristics based on the signals received from the GPS antenna 126 and communicate the route characteristics to the PAC 124. For example, the PAC 124 may receive a route distance, route directions, road grade information of the route, other route characteristics, or a combination thereof. In some embodiments, the PAC 124 may receive traffic signal location information, traffic stop sign location information, posted speed limit information, lane shift information, other route characteristics or information, or a combination thereof, from the mapping characteristics module based on location information from the GPS antenna 126.

The PAC 124 may receive further vehicle parameters from the vehicle sensors 108. For example, the vehicle sensors 108 may include an energy level sensor (e.g., a fuel level sensor or a battery charge sensor), an oil sensor, a speed sensor, a weight sensor, other suitable sensors, or a combination thereof. The PAC 124 may receive an energy level of the vehicle 10, a current weight of the vehicle 10, an oil condition of the vehicle 10, tire inflation information of the vehicle 10, a current vehicle speed, engine temperature information, other suitable vehicle parameters of the vehicle 10, or a combination thereof from the vehicle sensors 108. In some embodiments, the vehicle sensors 108 may include weather sensors, such as, a precipitation sensor or moisture sensor, a barometric pressure sensor, an ambient temperature sensor, other suitable sensors, or a combination thereof. The PAC 124 may receive current weather information, such as precipitation information, barometric pressure information, ambient temperature information, other suitable weather information, or a combination thereof, from the vehicle sensors 108.

The PAC 124 may receive at least some of the route characteristics from the ADAS modules 128. The ADAS modules 128 may assist the driver of the vehicle 10 to improve vehicle safety and road safety. The ADAS modules 128 may be configured to automate and/or adapt and enhance vehicle systems for safety and better driving. The ADAS modules 128 may be configured to alert the driver of the vehicle 10 of upcoming traffic conditions or disabled vehicles and/or to alert the vehicle 10 of a vehicle proximate to the vehicle 10 in order to avoid collisions and accidents. Further, the ADAS modules 128 may autonomously avoid collisions by implementing safeguards and taking over control of the vehicle 10, such as, by automatic lighting, initiating adaptive cruise control (e.g., via the VPC 102) and collision avoidance (e.g., by controlling a trajectory of the vehicle 10 or bringing the vehicle 10 to a complete stop either using the VPC 102 or directly using the brake controller 112). The PAC 124 may receive information, such as traffic characteristics, vehicle proximity information, disabled vehicle information, other suitable information, or a combination thereof, from the ADAS modules 128.

The PAC 124 may receive, at least, some of the route characteristics from the V2X module communication 130. The V2X communication module 130 is configured to communicate with other systems proximate or remotely located from the vehicle 10, as described, to obtain and share information, such as, traffic information, vehicle speed information, construction information, other information, or a combination thereof. The PAC 124 may receive other vehicle speed information, other vehicle location information, other traffic information, construction information, other suitable information, or a combination thereof, from the V2X communication module 130.

The PAC 124 may receive, at least, some of the route characteristics from the remote computing device 132. For example, the PAC 124 may receive further information regarding route distance, route directions, road grade information of the route, traffic information, construction information, other vehicle location information, other vehicle speed information, vehicle maintenance information of the vehicle 10, other route characteristics, or a combination thereof, from the remote computing device 132. Additionally, or alternatively, the PAC 124 may receive vehicle parameters from the remote computing device 132, such as, a make and model of the vehicle 10, manufacturer provided energy consumption efficiency of the vehicle 10, a weight of the vehicle 10, other vehicle parameters, or a combination thereof. In some embodiments, the PAC 124 may receive traffic signal location information, traffic stop sign location information, posted speed limit information, lane shift information, other route characteristics or information, or a combination thereof, from the remote computing device 132. The remote computing device 132 may include any suitable computing device or devices, such as a cloud computing device or system, a remotely located server or servers, a remotely or proximately located mobile computing device or application server that provides information to a mobile computing device, other suitable remote computing devices, or a combination thereof. The remote computing device 132 is remotely located from the vehicle 10, such as in a datacenter or other suitable location. In some embodiments, the remote computing device 132 may be located within the vehicle 10 (e.g., a mobile computing device used by the driver of the vehicle 10).

In some embodiments, the PAC 124 may receive traffic signal information, such as traffic signal phase and timing (SPaT) from a smart algorithm used by a traffic data provider. The SPaT information may indicate when traffic signals are changing and/or the timing of traffic signals.

The PAC 124 may receive route characteristics and/or vehicle parameters from the driver of the vehicle 10. For example, the driver may interact with an interface of the PAC 124, such as using the display 122 or using a mobile computing device, to provide vehicle parameters of the vehicle 10, such as, vehicle weight, vehicle make and model, vehicle age, vehicle maintenance information, vehicle identification number, a number of passengers, load information (e.g., an amount of luggage or other load information), other vehicle parameters, or a combination thereof. Additionally, or alternatively, the driver may provide route characteristics, such as a route map, route distance, other route characteristics, or a combination thereof, to the PAC 124. In some embodiments, the PAC 124 learns behavior of the driver of the vehicle 10. For example, the PAC 124 monitors the driver's vehicle speed relative to posted speed limits or whether the driver implements a vehicle speed recommendation, as will be described, provided by the PAC 124.

In some embodiments, the PAC 124 may learn traffic patterns for known routes traversed by the vehicle 10. For example, the PAC 124 may track traffic conditions while the vehicle 10 traverses one or more routes on a routine or regular basis. The PAC 124 may determine traffic patterns for the routes based on the monitored traffic conditions. In some embodiments, the PAC 124 receives traffic patterns for a route the vehicle 10 is traversing from the remote computing device 132, or from the mapping characteristics module based on the signals from the GPS antenna 126, as described.

It should be understood that the PAC 124 may receive any characteristics or information associated with routes, traffic, signage and signals, other vehicles, vehicle parameters of the vehicle 10, any other suitable characteristics or information, including those described or not described here, from any of the components described or not described herein. Additionally, or alternatively, the PAC 124 may be configured to learn any suitable characteristics or information described or not described herein.

In some embodiments, the PAC 124 is configured to control propulsion of the vehicle 10. The PAC 124 may be an integrated component of the VPC 102, or may be an overlay component that communicates with or interfaces with the VPC 102 and/or other components of the vehicle 10. Additionally, or alternatively, the PAC 124 may be disposed on a mobile computing device, such as a smart phone that uses, at least, some of the information described above, to present the driver of the vehicle 10 with a recommended vehicle speed. In some embodiments, the VPC 102 may include an adaptive cruise control mechanism. As described, the adaptive cruise control mechanism is configured to maintain the desired vehicle speed provided by the driver of the vehicle 10 using the HMI controls 104, and the adaptive cruise control mechanism is configured to maintain a safe distance between the vehicle 10 and a lead vehicle. Further, the adaptive cruise control mechanism is configured to bring the vehicle 10 to a complete stop in response to the lead vehicle coming to a complete stop. As described, the adaptive cruise control mechanism is incapable of restarting vehicle propulsion without interaction from the driver of the vehicle 10. Additionally, the adaptive cruise control mechanism is incapable of bringing the vehicle 10 to a complete stop in the absence of a lead vehicle. Accordingly, the VPC 102 (e.g., the adaptive cruise control mechanism) cannot take advantage of energy efficient vehicle propulsion control (e.g., such as a coasting to a stop in response to a determination that vehicle 10 is approaching a stop sign). The PAC 124 is configured to determine a target vehicle propulsion profile, which may include one or more target vehicle speeds and one or more target torque splits, based on an energy consumption profile for the vehicle 10. The PAC 124 may determine a target torque demand based on profiles of a target vehicle speed and/or a target torque split.

In some embodiments, the PAC 124 determines the vehicle energy consumption profile using the information described above. For example, the PAC 124 may determine the vehicle consumption profile using a vehicle weight, manufacturer provided vehicle energy efficiency, historical data corresponding to the vehicle 10 or similar vehicles indicating energy consumption of the vehicle 10 or similar vehicles while traversing portions of a particular route or specific road grades, or other suitable route or road information, other suitable vehicle parameters, or a combination thereof. The vehicle energy consumption profile may indicate that the vehicle 10 consumes a specified amount of energy (e.g., within a tolerance range) while operating at a specific vehicle speed (within a tolerance) while traversing routes having particular road, traffic, and other conditions. For example, the energy consumption of the vehicle 10 may be greater when the vehicle 10 is on an incline and may be less when the vehicle 10 is coasting to a stop. In some embodiments, the PAC 124 receives or retrieves a vehicle energy profile for the vehicle 10 determined remotely from the vehicle 10, such as by the remote computing device 132.

The PAC 124 is configured to use the vehicle energy consumption profile and various route characteristics to determine the profiles for the target vehicle speed and/or target torque split for a portion of a route being traversed by the vehicle 10. For example, the PAC 124 may determine that the vehicle 10 is approaching a particular variation in grade over the portion of the route being traversed by the vehicle 10. The PAC 124 uses the vehicle energy consumption profile to identify a vehicle speed (within a threshold range of the desired vehicle speed provided by the driver to the VPC 102) and/or a torque split having an optimum energy consumption for the grade variation of the portion of the route being traversed by the vehicle. In some embodiments, the PAC 124 may determine the vehicle speed and torque split using historical energy consumption for a known route, such as a route previously traversed by the vehicle 10 or similar vehicles. The PAC 124 determines a target torque demand from the identified vehicle speed and determines a target torque split from the identified torque split. It should be understood that the PAC 124 continuously monitors the various characteristics received, as described, and continues to generate profiles for target vehicle speeds and/or target torque splits, such that, the vehicle 10 maintains an optimum or improved energy consumption while maintaining driver and/or passenger comfort (e.g., by avoiding sudden, unnecessary charges in vehicle speed).

In some embodiments, the PAC 124 may be configured to determine when the vehicle 10 should coast to achieve optimum or improved energy consumption of the vehicle 10. For example, the PAC 124 may use known traffic conditions, as described, to determine when the vehicle 10 should coast. Additionally, or alternatively, the PAC 124 may learn traffic conditions, as described, and may determine whether the vehicle 10 should coast in areas along a route known to typically have traffic based, for example, on time of day. In some embodiments, the PAC 124 may use SPaT information to determine when the vehicle 10 should coast in response to a change in traffic signals. Additionally, or alternatively, the PAC 124 may determine to increase the target vehicle speed associated with the profile for the target vehicle speed (e.g., within the posted speed limit) in order to increase a likelihood that the vehicle 10 will arrive at a traffic signal while the traffic signal indicates to proceed, which may allow the vehicle 10 to avoid having to stop at traffic signals, based on traffic single timing.

In some embodiments, the PAC 124 may be configured to calculate a coast function and/or a road load function (see the Equation (2)) to identify particular vehicle parameters using velocity dependent resistance force. Parameters of the road load function include, vehicle parameters, such as vehicle mass or weight, vehicle rolling friction, vehicle drag coefficient, other vehicle parameters, or a combination thereof, which may be received by the PAC 124, as described. These parameters can then be updated using a coast self-learning function, such that the PAC 124 identifies or requests a coast sequence, (e.g., from historical information and/or from the remote computing device 132) and calculates the coast function result. The PAC 124 may calculate the coast function when requested by the driver of the vehicle 10 who would be prompted to perform a particular learning maneuver by the PAC 124, or could be learned in the background.

Equation (2) Velocity dependent resistive forces: F=wind, tires, bearings, and other forces plus acceleration dependent inertial forces plus grade dependent gravitational forces:

$$F = \left(A + (B * v) + \left(C * v^2\right)\right) + ((1 + \text{drive axle }\% + \text{non-drive axle }\%) * (\text{Test Mass} * \text{acceleration})) + (\text{Test Mass} * g * \sin(\arctan(\text{grade }\%)))$$

Where A represents the resistive force that is constant and does not vary with velocity (e.g., bearings, seals, tires, etc.), B represents the resistive force that varies linearly with velocity (e.g., drive train, differential, etc.), and C represents the resistive force that varies with the square of velocity (e.g., wind, tire deformation, etc.)

As described, the PAC 124 may control or interface with the VPC 102 and/or interface with the driver of the vehicle 10 in order to achieve the target vehicle speed and/or target torque split profiles, which may result in optimum or improved energy consumption efficiency of the vehicle 10. Additionally, or alternatively, the PAC 124 may control or interface with the VPC 102 in order to bring the vehicle 10 to a complete stop in response to the vehicle 10 approaching a stop sign, traffic signal, traffic, disabled vehicle, or other suitable conditions. The PAC 124 may also control or interface with the VPC 102 in order to resume vehicle propulsion after the vehicle 10 has come to a complete stop.

In some embodiments, the PAC 124 may control or interface with the VPC 102 using virtual inputs in order to achieve the target vehicle speed and/or target torque split profiles. As described, the VPC 102 may receive a desired vehicle speed from the driver of the vehicle 10 using the HMI controls 104. Additionally, or alternatively, the VPC 102 (e.g., when the VPC 102 includes an adaptive cruise control mechanism) may adjust the desired vehicle speed in response to a lead vehicle's speed.

In some embodiments, the PAC 124 initializes the VPC 102 using the desired speed provided by the driver of the vehicle 10 the first time the driver of the vehicle 10 engages the VPC 102 during a key cycle. The PAC 124 may then provide the virtual inputs to the VPC 102 in order to control vehicle speed to achieve optimum or improved energy consumption efficiency of the vehicle 10. In some embodiments, the PAC 124 may generate a virtual input that includes a virtual HMI signal that, when received by the VPC 102, may cause the VPC 102 to be enabled, be disabled, and/or to set or adjust the current vehicle speed. The PAC 124 generates the virtual HMI signal based on target vehicle speed profile. The PAC 124 is in communication with and/or interfaces with the HMI controls 104. The PAC 124 substitutes HMI signals provided by the driver of the vehicle 10 with the virtual HMI signal generated by the PAC 124. The VPC 102, as described, includes a plurality of safety controls. The VPC 102 then applies the target vehicle speed associated with the target vehicle speed profile indicated by the virtual HMI signal, in the same manner the VPC 102 applies a desired vehicle speed provided by the driver using the HMI controls 104, as described. The VPC 102 may determine whether to apply the target vehicle speed and/or the target torque split indicated by the virtual HMI signals based on the safety controls.

In some embodiments, the PAC 124 generates a virtual input that includes a virtual lead car in order to control the VPC 102 to bring the vehicle 10 to a complete stop in the absence of an actual lead car. For example, the PAC 124 may bring the vehicle 10 to a stop as the vehicle 10 approaches a stop sign, a traffic signal, traffic, a disabled vehicle, or other suitable stopping conditions that the vehicle 10 may encounter, as described. The PAC 124 substitutes information received by the VPC 102 from the vehicle sensors 108 (e.g., information the VPC 102 uses to detect an actual lead car) with virtual information, signals, and/or inputs corresponding to the virtual lead car.

The VPC 102 detects the presence of the virtual lead car and performs operations associated with following a lead car (e.g., maintain a safe distance between the vehicle 10 and the lead car, keeping pace with the lead car, and bringing the vehicle to a stop in response to the lead car being within an object range of the vehicle 10 and coming to a complete stop). The PAC 124 may then control a virtual speed of the virtual lead car based on the target vehicle speed profile. The VPC 102 may then adjust the current vehicle speed of the vehicle 10 to follow the virtual lead car. In this manner, the PAC 124 may achieve the target vehicle speed profile of the vehicle 10 to provide optimum or improved energy consumption efficiency of the vehicle 10. While the PAC 124 is controlling the VPC 102 using the virtual inputs described, the vehicle sensors 108, such as cameras, radar, proximity sensors, and the like, continue to provide information to the VPC 102, such that, while the VPC 102 is applying or following the virtual inputs provided by the PAC 124, the VPC 102 may continue to detect actual vehicles or objects in front of the vehicle 10. The safety controls of the VPC 102 are configured to override the VPC 102, including the virtual inputs provided by the PAC 124, to safely bring the vehicle 10 to a complete stop or increase or decrease vehicle speed in response to the information from the vehicle sensors 108

In some embodiments, the PAC 124 may be in direct communication with the VPC 102 and the torque split controller 116 to provide recommended target torque demands and target torque splits to the VPC 102 and the torque split controller 116, respectively, to achieve an optimum or improved energy consumption efficiency of the vehicle 10. For example, the VPC 102 may be configured to receive HMI signals (e.g., as described), to follow a lead vehicle based on information from the vehicle sensors 108 (e.g., as described), and to receive a recommended target vehicle speed signal from the PAC 124. The VPC 102 may determine whether to apply the target vehicle speed indicated by the recommended target vehicle speed signal, for example, based on the driver input, the detection of a lead vehicle, and/or the safety controls of the VPC 102.

The torque split controller 116 may be configured to receive a recommended torque split signal from the VPC 102 based on the driver input, as described, and may be configured to receive a recommended target torque split signal from the PAC 124. It should be understood that the PAC 124 may communicate the recommended target torque split signal to the VPC 102, which then may communicate the recommended target torque split signal and/or the recommended torque demand signal (e.g., generated by the VPC 102) to the torque split controller 116. The torque split controller 116 determines whether to apply the target torque split indicated by the recommended target toque split signal based on a comparison to the torque split indicated by the recommended torque split signal provided by the VPC 102 and/or based on an existing propulsion state of the vehicle 10 (e.g., including diagnostic conditions).

In some embodiments, the PAC 124 may communicate with the display 122 to provide an indicator to the driver that the vehicle speed is changing in order to improve energy consumption efficiency of the vehicle 10. For example, the PAC 124 may use the display 122 to illustrate an energy efficiency symbol that indicates to the driver of the vehicle 10 that the vehicle speed is changing in order to improve energy consumption efficiency of the vehicle 10.

In some embodiments, as described, the VPC 102 may not include an adaptive cruise control system and may include a basic cruise control system. Additionally, or alternatively, the driver of the vehicle 10 may not engage the VPC 102 in order to control propulsion of the vehicle 10 (e.g., the driver of the vehicle 10 may control propulsion manually). Accordingly, the PAC 124 is configured to provide a recommendation to the driver indicating a target vehicle speed of a target vehicle speed profile. The recommendation may be provided to the driver of the vehicle 10 using one or more integrated displays of the vehicle 10, such as the display 122 which may include a portion of a dash or console of the vehicle 10, a navigation display of the vehicle 10, or other suitable integrated displays of the vehicle 10. In some embodiments, the recommendation may be provided to the driver of the vehicle 10 using a mobile computing device within the vehicle 10. The recommendation may include a symbol or textual information that indicates to the driver of the vehicle 10 to increase or decrease vehicle speed. Additionally, or alternatively, the recommendation can include a coast recommendation that is displayed for a calibratable amount of time and is then withdrawn in response to the driver of the vehicle 10 ignoring the recommendation. The recommendation can include information indicating that the recommendation is in response to a charge in speed limit, a stop sign being approached by the vehicle 10, traffic signal timing, and status, or other information. The information may be visually displayed and may decay as the vehicle 10 recommendation becomes obsolete.

The driver of the vehicle 10 may determine to honor the recommendation and charge the vehicle speed accordingly, or the driver may choose to ignore the recommendation. The PAC 124 may be configured to monitor drive action in response to the recommendation to determine whether the driver of the vehicle 10 honored the recommendation or ignored the recommendation. The PAC 124 may determine whether to adjust recommendations based on the monitored driver action. For example, the PAC 124 may determine not to recommend coasting in response to the driver ignoring a threshold number of coasting recommendations. Additionally, or alternatively, the PAC 124 may determine, using the monitored driver action and the route traversed by the vehicle 10, whether the driver of the vehicle 10 honors the recommendation at certain portions of the route and ignores the recommendations at other portions of the route. The PAC 124 may selectively provide the recommendations to the driver of the vehicle 10 based on the monitored driver action and the vehicle route. Additionally, or alternatively, the PAC 124 may monitor the driver action in response to the recommendation based on traffic patterns, stop signs, traffic signals, and the like. The PAC 124 may selectively determine whether to provide the driver of the vehicle 10 the recommendations based on the monitored driver action in response to traffic patterns, stop signs, traffic signals, and the like.

In some embodiments, the PAC 124 and/or the VPC 102 may perform the methods described herein. However, the methods described herein as performed by the PAC 124 and/or the VPC 102 are not meant to be limiting, and any type of software executed on a controller can perform the methods described herein without departing from the scope of this disclosure. For example, a controller, such as a processor executing software within a computing device onboard the vehicle 10, can perform the methods described herein.

In some embodiments, the PAC 124 may be configured to estimate a remaining range of a vehicle battery of the vehicle 10. For example, the PAC 124 may identify at least one route characteristic of a portion of a selected route, as described. The PAC 124 may determine the vehicle energy consumption profile for the vehicle 10 based on at least historical data indicating energy consumption of the vehicle for at least a portion of a route previously traversed by the vehicle having at least one route characteristic corresponding to the at least one route characteristic of the portion of the selected route. The PAC 124 may determine a current SoC of a vehicle battery of the vehicle 10. For example, the PAC 124 may receive data from one or more of the sensors of the vehicle 10, including, but not limited to, a battery sensor configured to determine the SoC of the vehicle battery. It should be understood that while a single vehicle battery is described herein, the vehicle 10 may include any suitable number of batteries and the PAC 124 may estimate the remaining range of the vehicle 10 using the SoC of each battery. In some embodiments, the PAC 124 may use a state of energy of the battery in addition to or instead of the state of charge of the battery.

The PAC 124 may determine, for the selected route, a route energy consumption profile (e.g. which may represent the predicted energy usage for the route) based on the at least one route characteristic of the portion of the selected route and the vehicle energy consumption profile. The PAC 124 may calculate an estimated remaining charge for the vehicle battery at an end of the selected route based on the state of charge of the vehicle battery and the route energy consumption profile. PAC 124 may use a state of energy of the battery in addition to or instead of the state of charge of the battery. The PAC 124 may determine a remaining energy range of the vehicle in addition to or instead of the remaining charge of the battery.

The PAC 124 may determine whether the estimated remaining charge for the vehicle battery is within a vehicle battery charge range (e.g., which may represent an acceptable range for proceeding with the route). The vehicle battery charge range may include an upper limit and a lower limit. The vehicle battery charge range may be set by the driver (e.g., as one of the driver settings) or programmatically set during vehicle component manufacturing. The vehicle battery charge range may include a range of values with the lower limit being set to a number of miles of the selected route and the upper limit being set a predetermined number of miles greater than the lower limit. It should be understood that the vehicle battery charge range by include any suitable range. The PAC 124 may, in response to a determination that the estimated remaining charge is within the vehicle battery charge range, generate a first indication. The first indication may include the estimated remaining charge for the vehicle battery at the end of the selected route.

The PAC 124 may, in response to a determination that the estimated remaining charge is less than a lower limit of the vehicle battery charge range, generate a second indication. The second indication may include a warning indicating that the vehicle battery may be depleted before the vehicle 10 arrives at the end of the selected route. The PAC 124 provide one of the first indication and the second indication (e.g., based on the outcome of the determination of whether the remaining charge for the vehicle battery is within the vehicle battery charge range). For example, the PAC 124 may provide the first indication and/or the second indication at a display, such as the display 122, of the vehicle 10, at a mobile computing device, to an autonomous controller of the vehicle 10, and/or the like.

In some embodiments, the PAC 124 may, in response to the determination that the estimated remaining charge is less than the lower limit of the vehicle battery charge range, determine a target vehicle speed profile based on the at least one route characteristic, the vehicle energy consumption profile, and the state of charge of the vehicle battery. The PAC 124 may generate the second indication. The second indication may further include a recommendation to follow the target vehicle speed profile to avoid depleting the vehicle battery before the vehicle 10 arrives at the end of the selected route. The PAC 124 may control propulsion of the vehicle 10 based on the target vehicle speed profile and/or by providing recommendations to an operator of the vehicle to achieve the target vehicle speed profile, as described herein.

Figure 5:
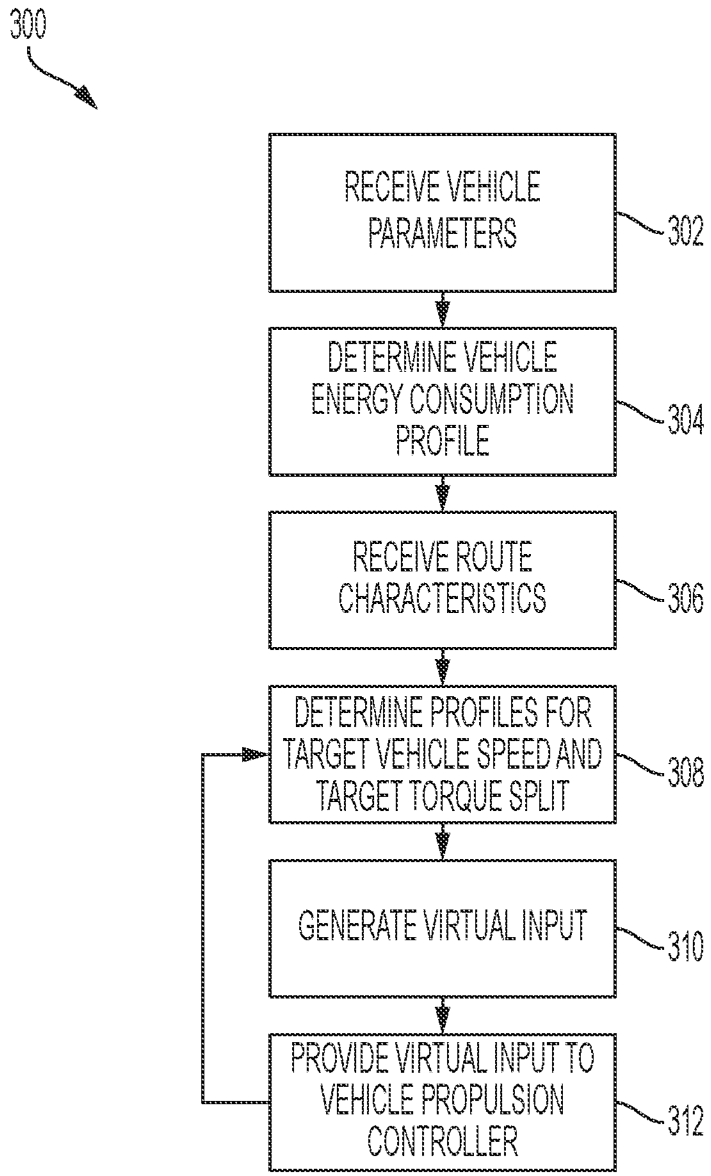
FIG. 5 is a flow diagram generally illustrating a vehicle propulsion control method according to the principles of the present disclosure.

FIG. 5 is a flow diagram generally illustrating a vehicle propulsion control method 300 according to the principles of the present disclosure. At 302, the method 300 receives vehicle parameters. For example, the PAC 124 may receive various vehicle parameters of the vehicle 10 from any of the components described herein.

At 304, the method 300 determines a vehicle energy consumption profile. For example, the PAC 124 determines the energy consumption profile for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof.

At 306, the method 300 receives route characteristics. For example, the PAC 124 receives various route characteristics (e.g., route characteristics for a route the vehicle 10 is either currently traversing or will traverse) and other information from any other components described herein. In some embodiments, the method continues at 308. In some embodiments, the method continues at 310.

At 308, the method 300 determines profiles for a target vehicle speed and/or a target toque split. For example, the PAC 124 determines profiles for a target vehicle speed and/or a target torque split based on the vehicle parameters, the route characteristics, the energy consumption profile of the vehicle 10, other information received, as described, from the various components described herein. The profiles of the target vehicle speed and/or target vehicle torque split correspond to a vehicle speed and/or a torque split that, when achieved by the vehicle 10, provide an optimum, or improved energy consumption efficiency of the vehicle 10.

At 310, the method 300 generates at least one virtual input. For example, the PAC 124 generates at least one virtual input. The virtual input may include a virtual HMI signal and/or a virtual lead vehicle. The virtual input, when applied by the VPC 102, achieves the target vehicle speed and/or the target torque split.

At 312, the method 300 provides the virtual input to the vehicle propulsion controller. For example, the PAC 124 may substitute HMI signals communicated from the HMI controls 104 based on input from the driver of the vehicle 10 with the virtual HMI signals. Additionally, or alternatively, the PAC 124 may substitute vehicle sensor information provided by the vehicle sensors 108 to indicate the virtual lead vehicle to the VPC 102. For example, the VPC 102 may apply the virtual HMI signals and/or may follow the virtual lead vehicle in order to achieve the target vehicle speed and/or torque split. For example, the PAC 124 may continuously update the target vehicle speed and/or target torque split as the vehicle 10 continues to traverse the route and based on updated traffic information, vehicle information, route information, other information, or a combination thereof.

Figure 6:
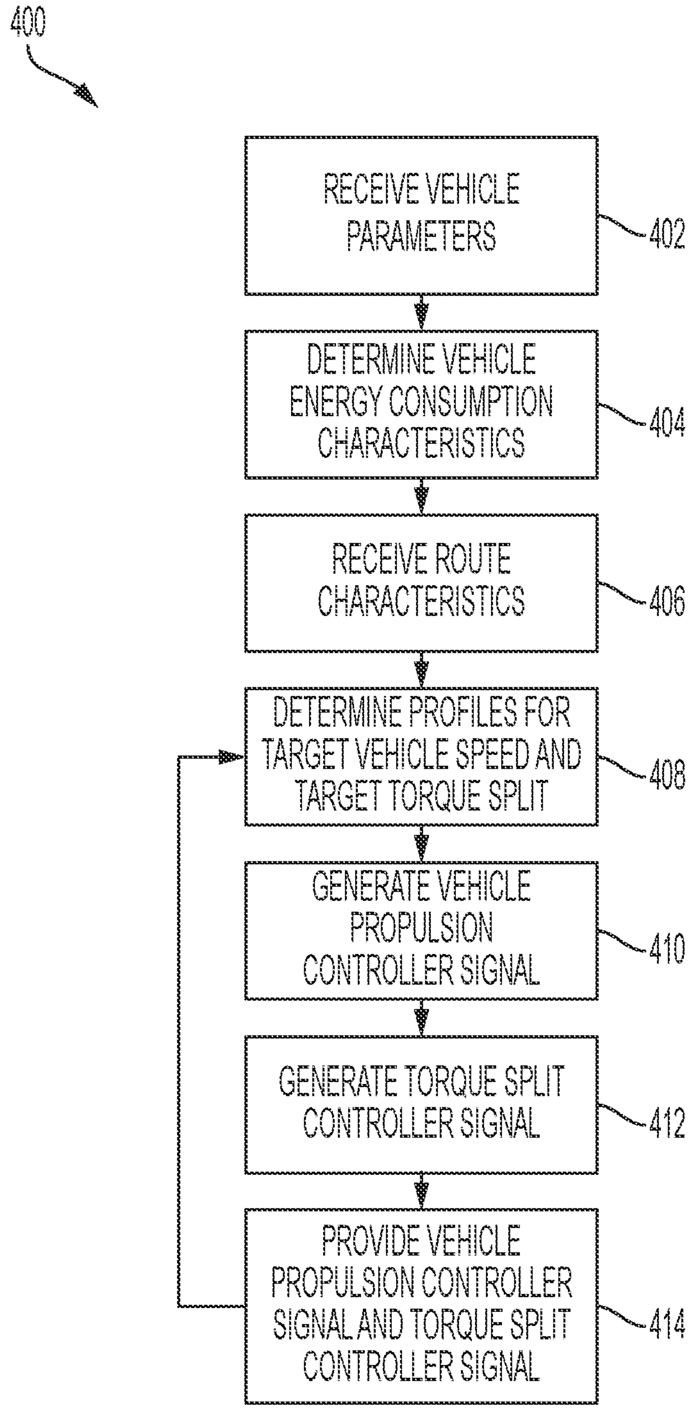
FIG. 6 is a flow diagram generally illustrating an alternative vehicle propulsion control method according to the principles of the present disclosure.

FIG. 6 is a flow diagram generally illustrating an alternative vehicle propulsion control method 400 according to the principles of the present disclosure. At 402, the method 400 receives vehicle parameters. For example, the PAC 124 may receive various vehicle parameters of the vehicle 10 from any of the components described herein.

At 404, the method 400 determines a vehicle energy consumption profile. For example, the PAC 124 determines the energy consumption profile for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof.

At 406, the method 400 receives route characteristics. For example, the PAC 124 receives various route characteristics (e.g., route characteristics for a route the vehicle 10 is either currently traversing or will traverse) and other information from any other components described herein. In some embodiments, the method continues at 408. In some embodiments, the method continues at 410.

At 408, the method 400 determines profiles for a target vehicle speed and/or a target toque split. For example, the PAC 124 determines profiles for a target vehicle speed and/or a target torque split based on the vehicle parameters, the route characteristics, the energy consumption profile of the vehicle 10, other information received, as described, from the various components described herein. The profiles for the target vehicle speed and/or target vehicle torque split correspond to a vehicle speed and/or a torque split that, when achieved by the vehicle 10, provide an optimum, or improved energy consumption efficiency of the vehicle 10.

At 410, the method 400 generates a vehicle propulsion controller signal. For example, the PAC 124 is in direct communication with the VPC 102 and may provide signals as an input to the VPC 102. The PAC 124 generates the vehicle propulsion controller signal based on the target vehicle speed. The vehicle propulsion controller signal may be referred to as a recommended target vehicle speed.

At 412, the method 400 generates a torque split controller signal. For example, the PAC 124 may be in direct communication with the torque split controller 116 and may provide signals as inputs to the torque split controller 116. The PAC 124 generates the torque split controller signal based on the target torque split. The torque split controller signal may be referred to as a recommended target torque split.

At 414, the method 400 provides the vehicle propulsion controller signal and the torque split controller signal. For example, the PAC 124 may provide the vehicle propulsion controller signal to the VPC 102. The VPC 102 may determine whether to apply the target vehicle speed indicated by the vehicle propulsion controller signal, as described. The PAC 124 may provide the torque split controller signal to the torque split controller 116 or may provide the torque split controller signal to the VPC 102, which then may provide the torque split signal to the torque split controller 116. The torque split controller 116 may then determine whether to apply the torque split indicated by the torque split controller signal, as described. The vehicle propulsion controller signal and torque split controller signal correspond to a vehicle speed and/or a torque split that, when achieved by the vehicle 10, provide an optimum, or improved energy consumption efficiency of the vehicle 10. For example, the PAC 124 may continuously update the target vehicle speed and/or target torque split as the vehicle 10 continues to traverse the route and based on updated traffic information, vehicle information, route information, other information, or a combination thereof.

Figure 7:
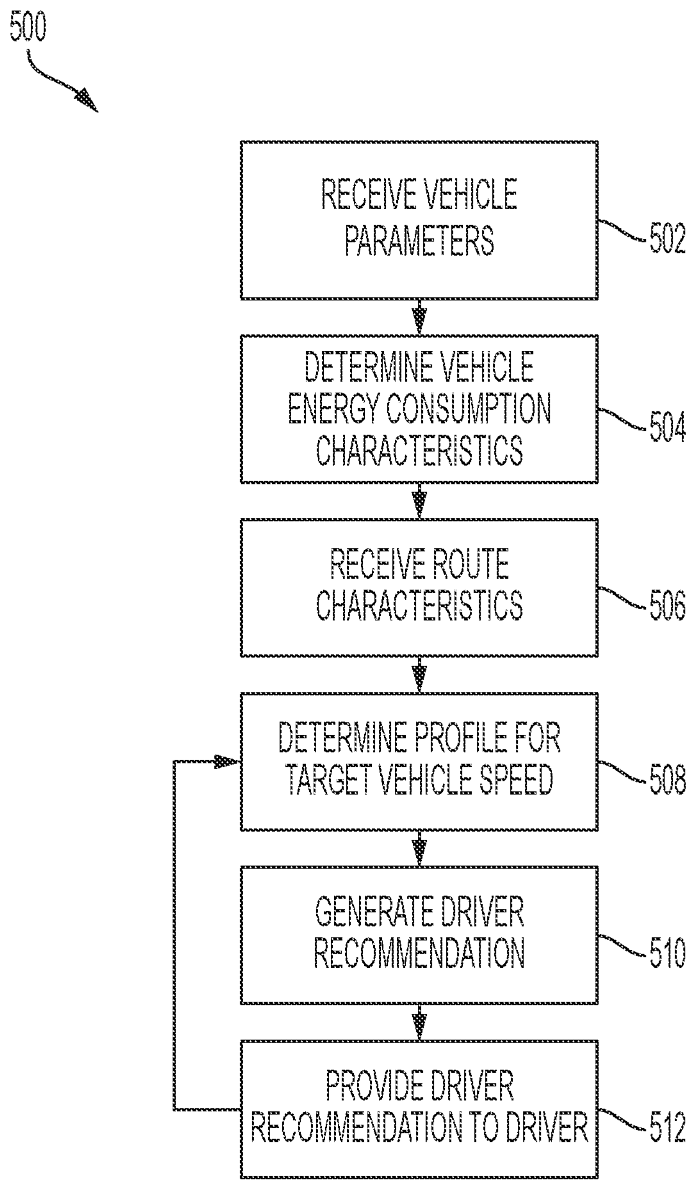
FIG. 7 is a flow diagram generally illustrating an alternative vehicle propulsion control method according to the principles of the present disclosure.

FIG. 7 is a flow diagram generally illustrating an alternative vehicle propulsion control method 500 according to the principles of the present disclosure. At 502, the method 500 receives vehicle parameters. For example, the PAC 124 may receive various vehicle parameters of the vehicle 10 from any of the components described herein.

At 504, the method 500 determines a vehicle energy consumption profile. For example, the PAC 124 determines the energy consumption profile for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof.

At 506, the method 500 receives route characteristics. For example, the PAC 124 receives various route characteristics (e.g., route characteristics for a route the vehicle 10 is either currently traversing or will traverse) and other information from any other components described herein. In some embodiments, the method continues at 508. In some embodiments, the method continues at 510.

At 508, the method 500 determines profiles for a target vehicle speed. For example, the PAC 124 determines a profile for a target vehicle speed based on the vehicle parameters, the route characteristics, the energy consumption profile of the vehicle 10, other information received, as described, from the various components described herein. The profile for the target vehicle speed corresponds to a vehicle speed that, when achieved by the vehicle 10, provide an optimum or improved energy consumption efficiency of the vehicle 10.

At 510, the method 500 generates a vehicle speed recommendation. For example, the PAC 124 generates a vehicle speed recommendation based on the profile of the target vehicle speed.

At 512, the method 500 provides the vehicle speed recommendation to the driver. For example, the PAC 124 may provide the vehicle speed recommendation to the driver of the vehicle 10 using the display 122, a mobile computing device, or other suitable devices or displays capable of providing the vehicle speed recommendation to the driver of the vehicle 10. For example, the driver of the vehicle 10 may honor the vehicle speed recommendation or ignore the vehicle speed recommendation. The vehicle speed recommendation corresponds to a vehicle speed, when achieved by the vehicle 10, provide an optimum, or improved energy consumption efficiency of the vehicle 10. For example, the PAC 124 may continuously update the profile of the target vehicle speed split as the vehicle 10 continues to traverse the route and based on updated traffic information, vehicle information, route information, other information, or a combination thereof.

Figure 8:
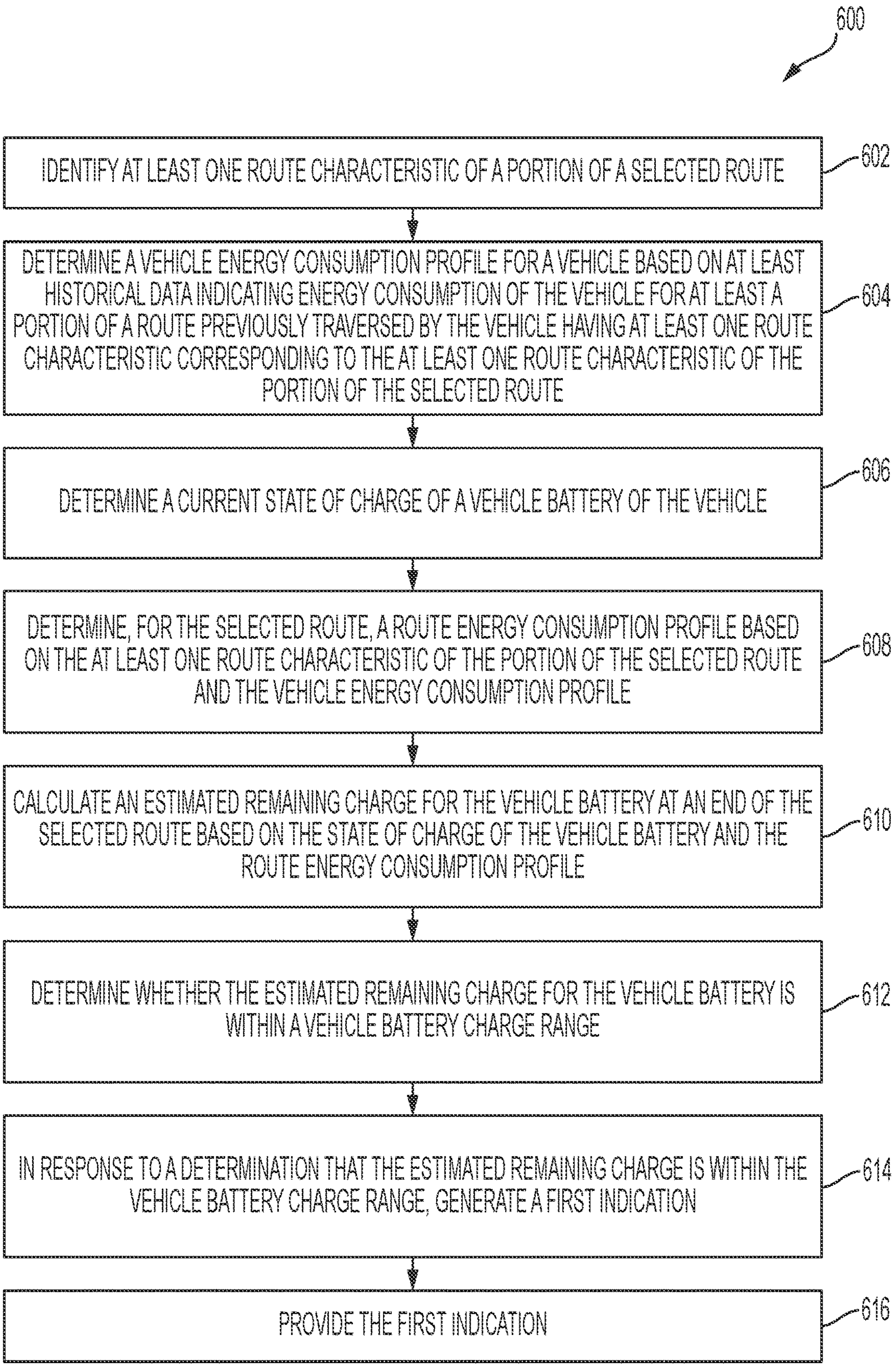
FIG. 8 is a flow diagram generally illustrating a remaining vehicle battery range estimation method according to the principles of the present disclosure.

FIG. 8 is a flow diagram generally illustrating a remaining vehicle battery range estimation method 600 according to the principles of the present disclosure. At 602, the method 600 identifies at least one route characteristic of a portion of a selected route. For example, the PAC 124 may identify the at least one route characteristic of the portion of the selected route.

At 604, the method 600 determines a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route. For example, the PAC 124 may determine the vehicle energy consumption profile for the vehicle 10 based on at least historical data indicating energy consumption of the vehicle 10 for at least a portion of a route previously traversed by the vehicle 10 having at least one route characteristic corresponding to the at least one route characteristic of the portion of the selected route.

At 606, the method 600 determines a current state of charge of a vehicle battery of the vehicle. For example, the PAC 124 may determine the current state of charge of the vehicle battery of the vehicle 10.

At 608, the method 600 determines, for the selected route, a route energy consumption profile based on the at least one route characteristic of the portion of the selected route and the vehicle energy consumption profile. For example, the PAC 124 may determine, for the selected route, a route energy consumption profile based on the at least one route characteristic of the portion of the selected route and the vehicle energy consumption profile.

At 610, the method 600 calculates an estimated remaining charge for the vehicle battery at an end of the selected route based on the state of charge of the vehicle battery and the route energy consumption profile. For example, the PAC 124 may calculate the estimated remaining charge for the vehicle battery at an end of the selected route based on the state of charge of the vehicle battery and the route energy consumption profile.

At 612, the method 600 determines whether the estimated remaining charge for the vehicle battery is within a vehicle battery charge range. For example, the PAC 124 may determine whether the estimated remaining charge for the vehicle battery is within a vehicle battery charge range.

At 614, the method 600, in response to a determination that the estimated remaining charge is within the vehicle battery charge range, generates a first indication. For example, the PAC 124 may generate, in response to the determination that the estimated remaining charge is within the vehicle battery charge range, the first indication At 616, the method 600 provides the first indication. For example, the PAC 124 may provide the first indication.

Figure 9:
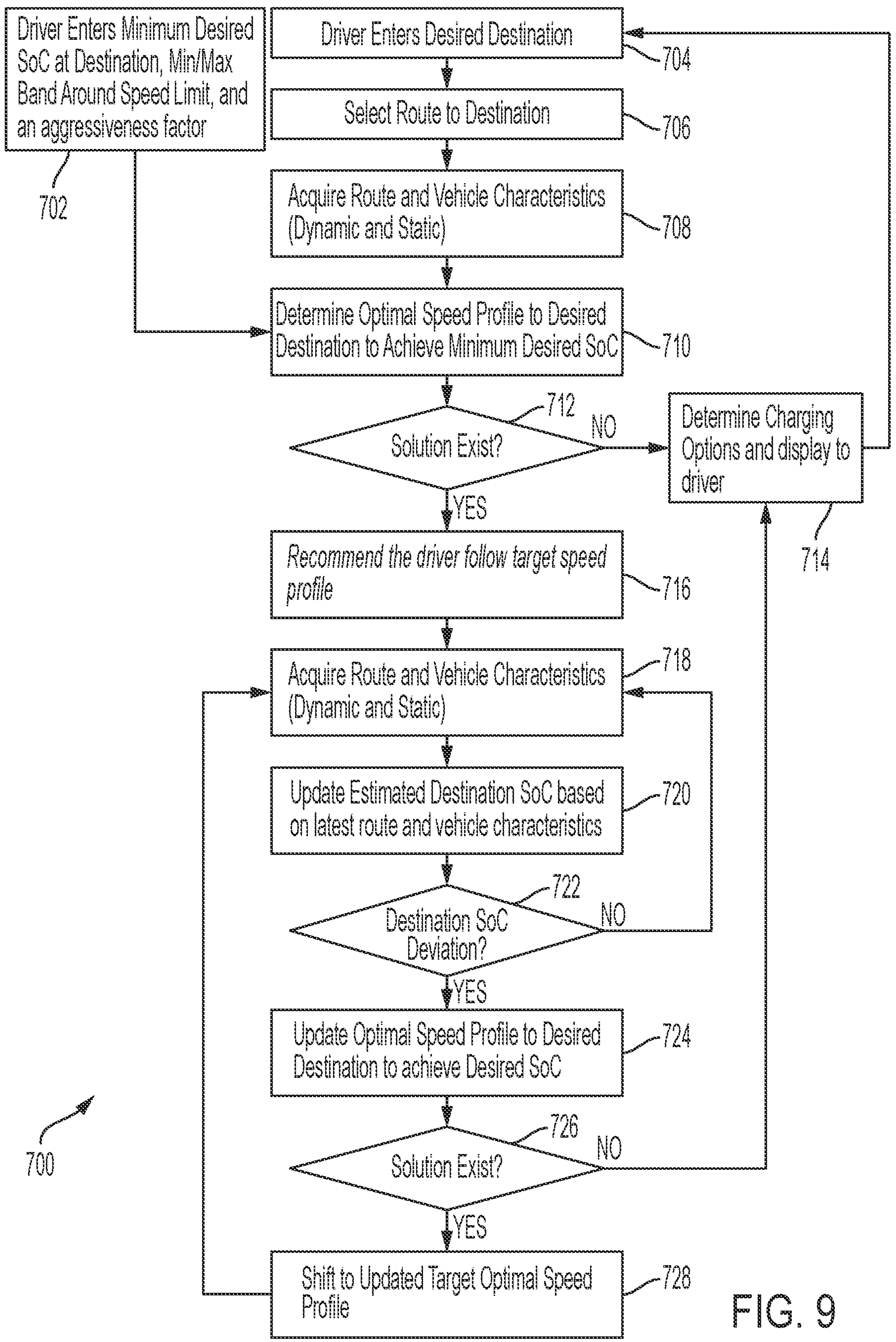
FIG. 9 is a flow diagram generally illustrating an alternative remaining vehicle battery range estimation method according to the principles of the present disclosure.

FIG. 9 is a flow diagram generally illustrating an alternative remaining vehicle battery range estimation method 700 according to the principles of the present disclosure. At 702, the method 700 receives, from the HMI controls 104, a minimum desired SoC at the destination, a minimum and maximum band around speed limit, and an aggressiveness factor. For example, the PAC 124 may receive, from the HMI controls 104, a minimum desired SoC at the destination, a minimum and maximum band around speed limit, and an aggressiveness factor.

At 704, the method 700 receives, from the HMI controls 104, a desired destination. For example, the PAC 124 may receive, from the HMI controls 104, the desired destination.

At 706, the method 700 selects a route to the desired destination. For example, the PAC 124 may select a route to the desired destination.

At 708, the method 700 acquires route and vehicle characteristics (e.g. dynamic and static). For example, the PAC 124 receives or retrieves the route characteristics of the selected route and the vehicle characteristics of the vehicle 10, as described.

At 710, the method 700 determines an optimal speed profile to the desired destination to achieve the minimum desired SoC. For example, the PAC 124 may determine the optimal speed profile to the desired destination to achieve the minimum desired SoC.

At 712, the method 700 determines whether a solution exists, as described. For example, the PAC 124 may determine whether the optimal speed profile to the desired destination exists, such that the minimum desired SoC is achievable. If yes, the method 700 continues at 716. If no, the method 700 continues at 714.

At 714, the method 700 determines charging options that the vehicle can stop along the route to charge and provides the options to the driver of the vehicle. For example, the PAC 124 may identify charging options along the route. The PAC 124 may provide the options to the driver via the display 122 or other suitable display. The method 700 continues at 704.

At 716, the method 700 recommends the driver proceed along the define route based on the defined target optimal speed profile. For example, the PAC 124 may recommend the driver proceed along the define route based on the defined target optimal speed profile.

At 718, the method 700 acquires route and vehicle characteristics. For example, the PAC 124 may receive or retrieve updated route characteristics for the selected route and updated vehicle characteristics for the vehicle 10.

At 720, the method 700 updates the estimated destination SoC based on the updated route and vehicle characteristics. For example, the PAC 124 may update the estimated destination SoC based on the updated route characteristics and the updated vehicle characteristics.

At 722, the method 700 determines whether the destination SoC is a deviation. For example, the PAC 124 may determine whether the destination SoC is a deviation. If yes, the method 700 continues at 724. If no, the method 700 returns to 718.

At 724, the method 700 updates the optimal speed profile to the desired destination to achieve the desired SoC. For example, the PAC 124 may update the optimal speed profile to the desired destination to achieve the desired SoC.

At 726, the method 700 determines whether a solution exits. For example, the PAC 124 may determine whether a solution exists, as described. If yes, the method 700 continues at 728. If not, the method 700 returns to 714.

At 728, the method 700 shifts to the updated target optimal speed profile. For example, the PAC 124 may control propulsion of the vehicle 10 or recommend the driver adhere to the updated target optimal speed profile.

Figure 10:
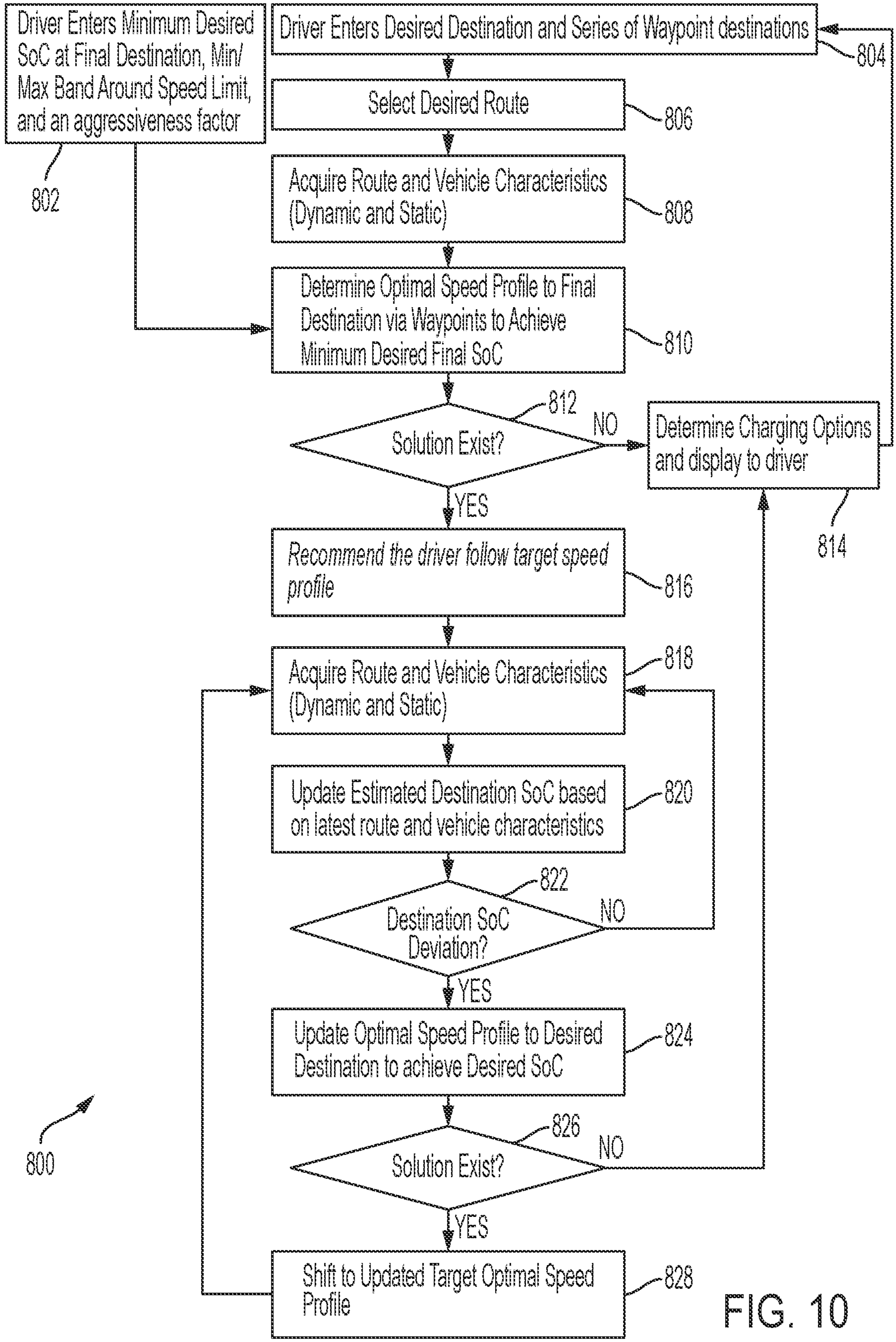
FIG. 10 is a flow diagram generally illustrating an alternative remaining vehicle battery range estimation method according to the principles of the present disclosure.

FIG. 10 is a flow diagram generally illustrating an alternative remaining vehicle battery range estimation method 800 according to the principles of the present disclosure. At 802, the method 800 receives, from the HMI controls 104, a minimum desired final SoC at the destination, a minimum and maximum band around speed limit, and an aggressiveness factor. For example, the PAC 124 may receive, from the HMI controls 104, a minimum desired final SoC at the destination, a minimum and maximum band around speed limit, and an aggressiveness factor.

At 804, the method 800 receives, from the HMI controls 104, a final destination and one or more waypoint destinations. For example, the PAC 124 may receive, from the HMI controls 104, the final destination and the one or more waypoint destinations.

At 806, the method 800 selects a route based on the final destination and the one or more waypoint destinations. For example, the PAC 124 may select a route based on the final destination and the one or more waypoint destinations.

At 808, the method 800 acquires route and vehicle characteristics (e.g. dynamic and static). For example, the PAC 124 receives or retrieves the route characteristics of the selected route and the vehicle characteristics of the vehicle 10, as described.

At 810, the method 800 determines an optimal speed profile based on the final destination and the one or more waypoint destinations to achieve the minimum desired final SoC. For example, the PAC 124 may determine the optimal speed profile based on the final destination and the one or more waypoint destinations to achieve the minimum desired SoC.

At 812, the method 800 determines whether a solution exists, as described. For example, the PAC 124 may determine whether the optimal speed profile, based on the final destination and the one or more waypoint destinations, exists, such that the minimum desired final SoC is achievable. If yes, the method 800 continues at 816. If no, the method 800 continues at 814.

At 814, the method 800 determines charging options that the vehicle can stop along the route to charge and provides the options to the driver of the vehicle. For example, the PAC 124 may identify charging options along the route. The PAC 124 may provide the options to the driver via the display 122 or other suitable display. The method 800 continues at 804.

At 816, the method 800 recommends the driver proceed along the define route based on the defined target optimal speed profile. For example, the PAC 124 may recommend the driver proceed along the define route based on the defined target optimal speed profile.

At 818, the method 800 acquires route and vehicle characteristics. For example, the PAC 124 may receive or retrieve updated route characteristics for the selected route and updated vehicle characteristics for the vehicle 10.

At 820, the method 800 updates the estimated destination SoC based on the updated route and vehicle characteristics. For example, the PAC 124 may update the estimated destination SoC based on the updated route characteristics and the updated vehicle characteristics.

At 822, the method 800 determines whether the destination SoC is a deviation. For example, the PAC 124 may determine whether the destination SoC is a deviation. If yes, the method 800 continues at 824. If no, the method 800 returns to 818.

At 824, the method 800 updates the optimal speed profile to the desired destination to achieve the desired final SoC. For example, the PAC 124 may update the optimal speed profile to the desired destination to achieve the desired final SoC.

At 826, the method 800 determines whether a solution exits. For example, the PAC 124 may determine whether a solution exists, as described. If yes, the method 800 continues at 828. If not, the method 800 returns to 814.

At 828, the method 800 shifts to the updated target optimal speed profile. For example, the PAC 124 may control propulsion of the vehicle 10 or recommend the driver adhere to the updated target optimal speed profile.

Figure 11:
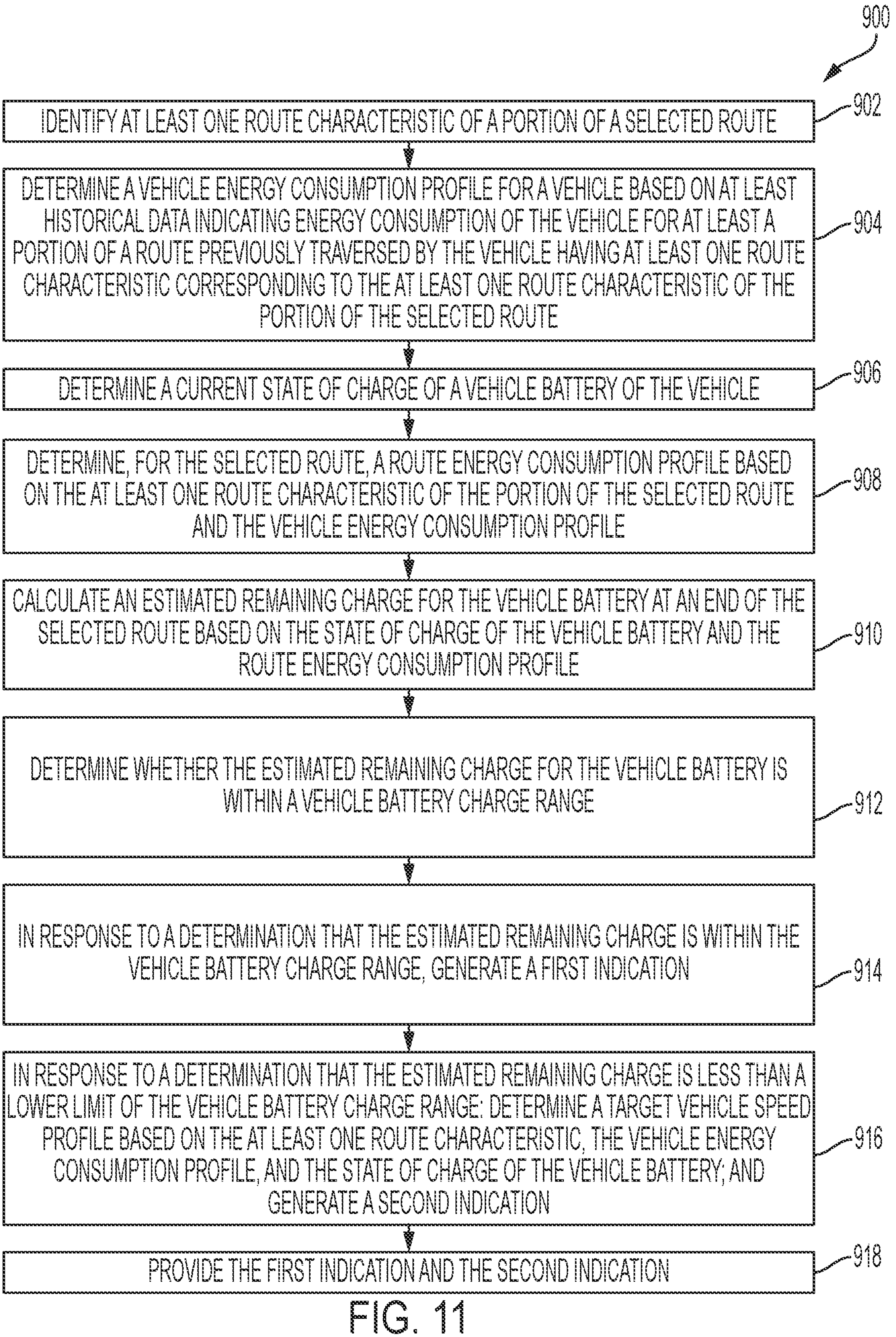
FIG. 11 is a flow diagram generally illustrating an alternative remaining vehicle battery range estimation method according to the principles of the present disclosure.

FIG. 11 is a flow diagram generally illustrating an alternative remaining vehicle battery range estimation method 900 according to the principles of the present disclosure. At 902, the method 900 identifies at least one route characteristic of a portion of a selected route. For example, the PAC 124 may identify the at least one route characteristic of the portion of the selected route.

At 904, the method 900 determines a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route. For example, the PAC 124 may determine the vehicle energy consumption profile for the vehicle 10 based on at least historical data indicating energy consumption of the vehicle 10 for at least a portion of a route previously traversed by the vehicle 10 having at least one route characteristic corresponding to the at least one route characteristic of the portion of the selected route.

At 906, the method 900 determines a current state of charge of a vehicle battery of the vehicle. For example, the PAC 124 may determine the current state of charge of the vehicle battery of the vehicle 10.

At 908, the method 900 determines, for the selected route, a route energy consumption profile based on the at least one route characteristic of the portion of the selected route and the vehicle energy consumption profile. For example, the PAC 124 may determine, for the selected route, a route energy consumption profile based on the at least one route characteristic of the portion of the selected route and the vehicle energy consumption profile.

At 910, the method 900 calculates an estimated remaining charge for the vehicle battery at an end of the selected route based on the state of charge of the vehicle battery and the route energy consumption profile. For example, the PAC 124 may calculate the estimated remaining charge for the vehicle battery at an end of the selected route based on the state of charge of the vehicle battery and the route energy consumption profile.

At 912, the method 900 determines whether the estimated remaining charge for the vehicle battery is within a vehicle battery charge range. For example, the PAC 124 may determine whether the estimated remaining charge for the vehicle battery is within a vehicle battery charge range.

At 914, the method 900, in response to a determination that the estimated remaining charge is within the vehicle battery charge range, generates a first indication. For example, the PAC 124 may generate, in response to the determination that the estimated remaining charge is within the vehicle battery charge range, the first indication.

At 916, the method 900, in response to a determination that the estimated remaining charge is less than a lower limit of the vehicle battery charge range: (i) determines a target vehicle speed profile based on the at least one route characteristics, the vehicle energy consumption profile, and the state of charge of the vehicle battery; and (ii) generates a second indication. For example, the PAC 124 may, in response to a determination that the estimated remaining charge is less than a lower limit of the vehicle battery charge range: (i) determine the target vehicle speed profile based on the at least one route characteristics, the vehicle energy consumption profile, and the state of charge of the vehicle battery; and (ii) generate the second indication.

At 918, the method 900 provides one of the first indication and the second indication. For example, the PAC 124 may provide the first indication in response to the determination that the estimated remaining charge is within the vehicle battery charge range and the second indication in response to a determination that the estimated remaining charge is less than a lower limit of the vehicle battery charge range.

Clause 1. A method for estimating a remaining range of a vehicle battery charge, the method comprising: identifying at least one route characteristic of a portion of a selected route; determining a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route; determining a current state of charge of a vehicle battery of the vehicle; determining, for the selected route, a route energy consumption profile based on the at least one route characteristic of the portion of the selected route and the vehicle energy consumption profile; calculating an estimated remaining charge for the vehicle battery at an end of the selected route based on the state of charge of the vehicle battery and the route energy consumption profile; determining whether the estimated remaining charge for the vehicle battery is within a vehicle battery charge range; in response to a determination that the estimated remaining charge is within the vehicle battery charge range, generating a first indication; and providing the first indication.

Clause 2. The method of any of the clauses described herein, wherein the first indication includes the estimated remaining charge for the vehicle battery at the end of the selected route.

Clause 3. The method of any of the clauses described herein, further comprising, in response to a determination that the estimated remaining charge is less than a lower limit of the vehicle battery charge range, generating a second indication.

Clause 4. The method of any of the clauses described herein, wherein the second indication includes a warning indicating that the vehicle battery may be depleted before the vehicle arrives at the end of the selected route.

Clause 5. The method of any of the clauses described herein, wherein providing the first indication includes providing, at a display of the vehicle, the first indication.

Clause 6. The method of any of the clauses described herein, wherein providing the first indication includes providing, at a mobile computing device, the first indication.

Clause 7. The method of any of the clauses described herein, wherein providing the first indication includes providing, to an autonomous controller of the vehicle, the first indication.

Clause 8. The method of any of the clauses described herein, wherein the at least one route characteristic includes at least one of a traffic condition, a traffic signal, and a road grade.

Clause 9. A system for estimating a remaining range of a vehicle battery charge, the system comprising: a processor; and a memory including instructions that, when executed by the processor, cause the processor to: identify at least one route characteristic of a portion of a selected route; determine a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route; determine a current state of charge of a vehicle battery of the vehicle; determine, for the selected route, a route energy consumption profile based on the at least one route characteristic of the portion of the selected route and the vehicle energy consumption profile; calculate an estimated remaining charge for the vehicle battery at an end of the selected route based on the state of charge of the vehicle battery and the route energy consumption profile; determine whether the estimated remaining charge for the vehicle battery is within a vehicle battery charge range; in response to a determination that the estimated remaining charge is within the vehicle battery charge range, generate a first indication; and provide the first indication.

Clause 10. The system of any of the clauses described herein, wherein the first indication includes the estimated remaining charge for the vehicle battery at the end of the selected route.

Clause 11. The system of any of the clauses described herein, wherein the instructions further cause the processor to, in response to a determination that the estimated remaining charge is less than a lower limit of the vehicle battery charge range, generate a second indication.

Clause 12. The system of any of the clauses described herein, wherein the second indication includes a warning indicating that the vehicle battery may be depleted before the vehicle arrives at the end of the selected route.

Clause 13. The system of any of the clauses described herein, wherein the instructions further cause the processor to provide, at a display of the vehicle, the first indication.

Clause 14. The system of any of the clauses described herein, wherein the instructions further cause the processor to provide, at a mobile computing device, the first indication.

Clause 15. The system of any of the clauses described herein, wherein the instructions further cause the processor to provide, to an autonomous controller of the vehicle, the first indication.

Clause 16. The system of any of the clauses described herein, wherein the at least one route characteristic includes at least one of a traffic condition, a traffic signal, and a road grade.

Clause 17. A non-transitory computer-readable storage medium, comprising executable instructions that, when executed by a processor, facilitate performance of operations, comprising: identifying at least one route characteristic of a portion of a selected route; determining a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route; determining a current state of charge of a vehicle battery of the vehicle; determining, for the selected route, a route energy consumption profile based on the at least one route characteristic of the portion of the selected route and the vehicle energy consumption profile; calculating an estimated remaining charge for the vehicle battery at an end of the selected route based on the state of charge of the vehicle battery and the route energy consumption profile; determining whether the estimated remaining charge for the vehicle battery is within a vehicle battery charge range; in response to a determination that the estimated remaining charge is within the vehicle battery charge range, generating a first indication; in response to a determination that the estimated remaining charge is less than a lower limit of the vehicle battery charge range, generate a second indication; providing, at a vehicle display, one of the first indication and the second indication.

Clause 18. The non-transitory computer-readable storage medium of any of the clauses described herein, wherein the first indication includes the estimated remaining charge for the vehicle battery at the end of the selected route.

Clause 19. The non-transitory computer-readable storage medium of any of the clauses described herein, wherein the second indication includes a warning indicating that the vehicle battery may be depleted before the vehicle arrives at the end of the selected route.

Clause 20. The non-transitory computer-readable storage medium of any of the clauses described herein, wherein the at least one route characteristic includes at least one of a traffic condition, a traffic signal, and a road grade.

21. A method for estimating a remaining range of a vehicle battery charge, the method comprising: identifying at least one route characteristic of a portion of a selected route; determining a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route; determining a current state of charge of a vehicle battery of the vehicle; determining, for the selected route, a route energy consumption profile based on the at least one route characteristic of the portion of the selected route and the vehicle energy consumption profile; calculating an estimated remaining charge for the vehicle battery at an end of the selected route based on the state of charge of the vehicle battery and the route energy consumption profile; determining whether the estimated remaining charge for the vehicle battery is within a vehicle battery charge range; in response to a determination that the estimated remaining charge is within the vehicle battery charge range, generating a first indication; in response to a determination that the estimated remaining charge is less than a lower limit of the vehicle battery charge range: determining a target vehicle speed profile based on the at least one route characteristic, the vehicle energy consumption profile, and the state of charge of the vehicle battery; and generating a second indication; and providing one of the first indication and the second indication.

Clause 22. The method of any of the clauses described herein, wherein the first indication includes the estimated remaining charge for the vehicle battery at the end of the selected route.

Clause 23. The method of any of the clauses described herein, wherein the second indication includes a warning indicating that the vehicle battery may be depleted before the vehicle arrives at the end of the selected route and a recommendation to follow the target vehicle speed profile to avoid depleting the vehicle battery before the vehicle arrives at the end of the selected route.

Clause 24. The method of any of the clauses described herein, wherein providing the one of the first indication and the second indication includes providing, at a display of the vehicle, the one of the first indication and the second indication.

Clause 25. The method of any of the clauses described herein, wherein providing the one of the first indication and the second indication includes providing, at a mobile computing device, the one of the first indication and the second indication.

Clause 26. The method of any of the clauses described herein, wherein providing the one of the first indication and the second indication includes providing, to an autonomous controller of the vehicle, the one of the first indication and the second indication.

Clause 27. The method of any of the clauses described herein, wherein the at least one route characteristic includes at least one of a traffic condition, a traffic signal, and a road grade.

Clause 28. A system for estimating a remaining range of a vehicle battery charge, the system comprising: a processor; and a memory including instructions that, when executed by the processor, cause the processor to: identify at least one route characteristic of a portion of a selected route; determine a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route; determine a current state of charge of a vehicle battery of the vehicle; determine, for the selected route, a route energy consumption profile based on the at least one route characteristic of the portion of the selected route and the vehicle energy consumption profile; calculate an estimated remaining charge for the vehicle battery at an end of the selected route based on the state of charge of the vehicle battery and the route energy consumption profile; determine whether the estimated remaining charge for the vehicle battery is within a vehicle battery charge range; in response to a determination that the estimated remaining charge is within the vehicle battery charge range, generate a first indication; in response to a determination that the estimated remaining charge is less than a lower limit of the vehicle battery charge range: determine a target vehicle speed profile based on the at least one route characteristic, the vehicle energy consumption profile, and the state of charge of the vehicle battery; and generate a second indication; and provide one of the first indication and the second indication.

Clause 29. The system of any of the clauses described herein, wherein the first indication includes the estimated remaining charge for the vehicle battery at the end of the selected route.

Clause 30. The system of any of the clauses described herein, wherein the second indication includes a warning indicating that the vehicle battery may be depleted before the vehicle arrives at the end of the selected route and a recommendation to follow the target vehicle speed profile to avoid depleting the vehicle battery before the vehicle arrives at the end of the selected route.

Clause 31. The system of any of the clauses described herein, wherein the instructions further cause the processor to provide, at a display of the vehicle, the one of the first indication and the second indication.

Clause 32. The system of any of the clauses described herein, wherein the instructions further cause the processor to provide, at a mobile computing device, the one of the first indication and the second indication.

Clause 33. The system of any of the clauses described herein, wherein the instructions further cause the processor to provide, to an autonomous controller of the vehicle, the one of the first indication and the second indication.

Clause 34. The system of any of the clauses described herein, wherein the at least one route characteristic includes at least one of a traffic condition, a traffic signal, and a road grade.

Clause 35. A non-transitory computer-readable storage medium, comprising executable instructions that, when executed by a processor, facilitate performance of operations, comprising: identifying at least one route characteristic of a portion of a selected route; determining a vehicle energy consumption profile for a vehicle based on at least historical data indicating energy consumption of the vehicle for at least a portion of a route previously traversed by the vehicle having at least one route characteristic corresponding to the at least one route characteristic of the portion of the selected route; determining a current state of charge of a vehicle battery of the vehicle; determining, for the selected route, a route energy consumption profile based on the at least one route characteristic of the portion of the selected route and the vehicle energy consumption profile; calculating an estimated remaining charge for the vehicle battery at an end of the selected route based on the state of charge of the vehicle battery and the route energy consumption profile; determining whether the estimated remaining charge for the vehicle battery is within a vehicle battery charge range; in response to a determination that the estimated remaining charge is less than a lower limit of the vehicle battery charge range: determining a target vehicle speed profile based on the at least one route characteristic, the vehicle energy consumption profile, and the state of charge of the vehicle battery; and generating an indication; and providing the second indication.

Clause 36. The non-transitory computer-readable storage medium of any of the clauses described herein, wherein the indication includes a warning indicating that the vehicle battery may be depleted before the vehicle arrives at the end of the selected route and a recommendation to follow the target vehicle speed profile to avoid depleting the vehicle battery before the vehicle arrives at the end of the selected route.

Clause 37. The non-transitory computer-readable storage medium of any of the clauses described herein, wherein providing the indication includes providing, at a display of the vehicle, the indication.

Clause 38. The non-transitory computer-readable storage medium of any of the clauses described herein, wherein providing the indication includes providing, at a mobile computing device, the indication.

Clause 39. The non-transitory computer-readable storage medium of any of the clauses described herein, wherein providing the indication includes providing, to an autonomous controller of the vehicle, the indication.

Clause 40. The non-transitory computer-readable storage medium of any of the clauses described herein, further comprising selectively controlling vehicle propulsion of the vehicle based on the target vehicle speed profile.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for estimating a remaining range of a vehicle battery charge, the method comprising, at a processor and in real-time:

receiving one or more global positioning signals from at least one of a global positioning system antenna disposed within a vehicle and a global positioning system disposed on a remotely located computing device;

generating route information based on the one or more global positioning signals;

identifying at least one route characteristic of a portion of a selected route based on the route information;

determining a vehicle energy consumption profile for the vehicle based on at least one of (i) historical data indicating energy consumption of the vehicle for at least a portion of a route previously traversed by the vehicle having at least one route characteristic corresponding to the at least one route characteristic of the portion of the selected route, (ii) a plurality of vehicle parameters, wherein the plurality of vehicle parameters includes at least a vehicle identification number and at least one of a vehicle weight, a vehicle make, a vehicle model, and a vehicle age, and (iii) at least one characteristic of another vehicle, wherein the at least one characteristic of the other vehicle is received via a vehicle to other systems (V2X) communication module disposed on the vehicle;

determining a current state of charge of a vehicle battery of the vehicle;

determining, for the selected route, using a physics-based model and road load equation, a route energy consumption profile based on the at least one route characteristic of the portion of the selected route and the vehicle energy consumption profile;

calculating, using a regression model, an estimated remaining charge for the vehicle battery at an end of the selected route based on the current state of charge of the vehicle battery, the route energy consumption profile, at least one driver controlled vehicle setting, and a pattern of use of the at least one driver controlled vehicle setting learned by the regression model;

determining whether the estimated remaining charge for the vehicle battery is within a vehicle battery charge range;

in response to a determination that the estimated remaining charge is within the vehicle battery charge range, generating a first indication;

in response to a determination that the estimated remaining charge is not within the vehicle battery charge range:

determining a target vehicle speed profile; and generating a second indication based on at least the target vehicle speed profile;

providing the first indication; and controlling propulsion of the vehicle based on the target vehicle speed.

2. The method of claim 1, wherein the first indication includes the estimated remaining charge for the vehicle battery at the end of the selected route.

3. The method of claim 1, further comprising generating the second indication further based on the vehicle energy consumption profile and the current state of charge of the vehicle battery.

4. The method of claim 3, wherein the second indication includes a warning indicating that the vehicle battery may be depleted before the vehicle arrives at the end of the selected route.

5. The method of claim 1, wherein providing the first indication includes providing, at a display of the vehicle, the first indication.

6. The method of claim 1, wherein providing the first indication includes providing, at a mobile computing device, the first indication.

7. The method of claim 1, wherein providing the first indication includes providing, to an autonomous controller of the vehicle, the first indication.

8. The method of claim 1, wherein the at least one route characteristic of the portion of the selection route includes at least one of a traffic condition, a traffic signal, and a road grade.

9. A non-transitory computer-readable storage medium, comprising executable instructions that, when executed by a processor, facilitate performance of operations, comprising:

identifying at least one route characteristic of a portion of a selected route;

determining a vehicle energy consumption profile for a vehicle based on at least one of (i) historical data indicating energy consumption of the vehicle for at least a portion of a route previously traversed by the vehicle having at least one route characteristic corresponding to the at least one route characteristic of the portion of the selected route, (ii) a plurality of vehicle parameters, wherein the plurality of vehicle parameters includes at least a vehicle identification number and at least one of a vehicle weight, a vehicle make, a vehicle model, and a vehicle age, and (iii) at least one characteristic of another vehicle, wherein the at least one characteristic of the other vehicle is received via a vehicle to other systems (V2X) communication module disposed on the vehicle;

determining a current state of charge of a vehicle battery of the vehicle;

determining, for the selected route, using a physics-based model and road load equation, a route energy consumption profile based on the at least one route characteristic of the portion of the selected route and the vehicle energy consumption profile;

calculating, using a regression model, an estimated remaining charge for the vehicle battery at an end of the selected route based on the current state of charge of the vehicle battery, the route energy consumption profile, at least one driver controlled vehicle setting, and at least one prediction of use of the at least one driver controlled vehicle setting generated by the regression model based on a learned pattern of the at least one driver controlled vehicle setting;

determining whether the estimated remaining charge for the vehicle battery is within a vehicle battery charge range;

in response to a determination that the estimated remaining charge is within the vehicle battery charge range, generating a first indication;

in response to a determination that the estimated remaining charge is less than a lower limit of the vehicle battery charge range: determining a target vehicle speed profile; and generating a second indication based on the target vehicle speed profile;

providing, at a vehicle display, one of the first indication and the second indication; and controlling propulsion of the vehicle based on the target vehicle speed.

10. The non-transitory computer-readable storage medium of claim 9, wherein the first indication includes the estimated remaining charge for the vehicle battery at the end of the selected route.

11. The non-transitory computer-readable storage medium of claim 9, wherein the second indication includes a warning indicating that the vehicle battery may be depleted before the vehicle arrives at the end of the selected route.

12. The non-transitory computer-readable storage medium of claim 9, wherein the at least one route characteristic of the portion of the selection route includes at least one of a traffic condition, a traffic signal, and a road grade.

* * * * *